United States Patent [19]

Strasnick et al.

[11] Patent Number: 5,555,354
[45] Date of Patent: Sep. 10, 1996

[54] METHOD AND APPARATUS FOR NAVIGATION WITHIN THREE-DIMENSIONAL INFORMATION LANDSCAPE

[75] Inventors: Steven L. Strasnick, Mountain View; Joel D. Tesler, Cupertino, both of Calif.

[73] Assignee: Silicon Graphics Inc., Mountain View, Calif.

[21] Appl. No.: 36,115

[22] Filed: Mar. 23, 1993

[51] Int. Cl.$^6$ ..................... G06T 15/20
[52] U.S. Cl. ............. 395/127; 395/128; 395/139; 395/140; 395/155; 395/160
[58] Field of Search ............ 395/119, 127, 395/140, 128, 155, 161, 139, 160

[56] References Cited

U.S. PATENT DOCUMENTS

| | | | |
|---|---|---|---|
| 3,816,726 | 6/1974 | Sutherland et al. | 382/41 |
| 4,868,771 | 9/1989 | Quick et al. | 395/127 X |
| 4,928,247 | 5/1990 | Doyle et al. | 395/160 |
| 4,994,989 | 2/1991 | Usami et al. | 395/128 X |
| 5,043,920 | 8/1991 | Malm et al. | 395/140 X |
| 5,072,395 | 12/1991 | Bliss et al. | 364/443 |
| 5,150,457 | 9/1992 | Behm et al. | 395/140 X |
| 5,164,904 | 11/1992 | Sumner | 364/436 |
| 5,295,243 | 3/1994 | Robertson et al. | 395/160 |
| 5,307,456 | 4/1994 | MacKay | 395/154 |

OTHER PUBLICATIONS

Fuller, "Using Autocad", Third Edition, Release 10 with 3-D, Delmar Publishers Inc., 1989, Chapter 17 and pp. 19-15, 19-16.

Flanagan, "Cyberspace meets Wall Street", Forbes, Jun. 22, 1992, pp. 164-168.

Advertisement for PV-Wave Point & Click from Precision Visuals Inc. 1991.

Guindon, "Cognitive Science and its Applications for Human-Computer Interaction", 1988, Lawrence Erlbaum Associates, publishers, chapter 5, pp. 201-233.

Grinstein, G., et al., "Visualization for Knowledge Discovery," *Intl. J. Intelligent Systems* 7: 637-648 (1992).

Carlbom, I., et al., "A Hierarchical Data Structure for Representing the Spatial Decomposition of 3-D Objects," *IEEE CG&A*:24-31 (Apr. 1985).

Carlbom, I., et al., "Planar Geometric Projections and Viewing Transformations," *Computing Surveys* 10 (4.1):465-502 (Dec. 1978).

Alexander, M., "GIS Sprouting Corporate Wings," *Computerworld*, p. 20 (Jul. 22, 1991).

Alexander, M., "Visualizing Cleared-Off Desktops," *Computerworld* 25 (18), p. 20 (May 6, 1991).

(List continued on next page.)

*Primary Examiner*—Mark K. Zimmerman
*Attorney, Agent, or Firm*—Sterne, Kessler, Goldstein & Fox P.L.L.C.

[57] ABSTRACT

A method and apparatus for navigating within a three dimensional graphic display space and manipulating information and data represented by objects in display space. The method and apparatus presents users with a vastly expanded view of their data, displayed with a richer dimensionality. Data objects represented by graphic objects are arranged into a navigable landscape representing the containership and contextual relations of the underlying data. The graphic objects are columns, pedestals and disks, which represent data blocks, cells, and comparative values respectively. The columns rest on the pedestals. The disks are located with respect to the top of the column to signify a comparative attribute. The pedestal rest upon a ground plane. The ground plane represents a threshold value. Data attributes may be represented by visual, textual, executable, or audible characteristics of the display. The user may interact with the data to affect change in the underlying data or its representation within the display space. Less detail is displayed as the user navigates away from objects within the display space. Objects change from three-dimensional to two-dimensional, to line segments as the user moves away from the objects. Visible attributes such as text and icons are not displayed for distant objects.

48 Claims, 30 Drawing Sheets

Microfiche Appendix Included
(6 Microfiche, 236 Pages)

OTHER PUBLICATIONS

Anthes, G. H., "GIS Eases Redistricting Worry," *Computerworld*, p. 65 (Oct. 7, 1991).

Benedikt, M., ed., "Cyberspace: First Steps," The MIT Press, Cambridge, Massachusetts (1992), Nov. 23, 1991), pp. 1–436 (Book enclosed).

Clarkson, M. A., "An Easier Interface," *BYTE*, pp. 277–282 (Feb. 1991).

Forrest, D., "Seeing Data In New Ways," *Computerworld*, pp. 85–86 (Jun. 29, 1992).

Hildebrand, C., "GIS Vital In Utility's Duel With Competitor," *Computerworld*, p. 43 (Jan. 20, 1992).

Jacobson, B., "The Ultimate User Interface," *BYTE*, pp. 175–182 (Apr. 1992).

Johnson, B. et al., "Tree–Maps: A Space–Filling Approach To The Visualization Of Hierarchical Information Structures," IEEE Proceedings Visualization '91 San Diego, CA, pp. 284–291 (Oct. 21–25, 1991).

Newquist, H. P., "Virtual Reality's Commerical Reality," *Computerworld* 26, (13):93–95 (Mar. 30, 1992).

Radding, A., "PC GIS: Expert Gain But Also Some Pain," *Computerworld*, p. 89 (Feb. 17, 1992).

"News: What's New—Business Software" *Byte*, p. 78 (Mar. 1992).

News Release, Company: Information Builders, Dateline: Pacific Palisades, CA, "Remarkable 3D Main–Frame Graphics Available For PC Users," (Feb. 1985).

News Release, Company: Honeywell Bull, Dateline: Palm Desert, CA, "Information Builders Announces Release 3.0 Of PC/FOCUS DBMS," (Jun. 1, 1987).

News Release, Company: Silicon Graphics, Dateline: Bilerica, MA, "Relational Software System Increases Integration, Productivity For Honeywell Bull Users," (Jul. 17, 1987).

News Release, Company: Alliant Computer Systems, Dateline: San Diego, CA, "TGS' Figaro To Be Marketed With Silicon Graphics," (Jul. 8, 1988).

News Release, Company: Alliant Computer Systems Corporation, Dateline: Atlanta, GA, "Alliant Debuts New Class of System The Visual Supercomputer," (Aug. 2, 1988).

News Release, Company: Virtus, Dateline: Pleasanton, CA, "Individual Software Introduces Training for Microsoft Excel 3.0 Windows and Macintosh Versions," (Jul. 31, 1991).

News Release, Company: Virtus Corporation, Dateline: Cary, NC, "Virtus Walkthrough Releases Quicktime Component," (Nov. 1, 1991).

News Release, Company: Alias Research, Dateline: Toronto, Ontario, "Alias ships Sketch!, Freeform 3D Illustration and Design Program," (Nov. 15, 1991).

News Release, Company: Structural Dynamics Res Intl. Business Machines, Dateline: Boston, MA, "Alias Sketch (TM) Resumes Shipping: Freeform 3D illustration and design too!," (Feb. 19, 1992).

News Release, Company: Structural Dynamics Research Corporation, Dateline: Milford, OH, Structural Dynamics Research Corporation, "SDRC Announces Software Translator Between CADAM and I–DEAS," (Mar. 31, 1992).

Wilder, C., "Virtual Reality Seeks Practicality," *Computerworld* 26 (17), p. 26 (Apr. 27, 1992).

FIG. 10A

| WORKSHEET | Q3_SALES | TYPE | CUMULATIVE TREE |
|---|---|---|---|

| ORIGIN | ACME INC. | TREE OPERATION | | SUM | |
|---|---|---|---|---|---|
| BLOCK TYPE | BAR | LEVELS | 6 | BLOCK # | 4 |
| BLOCK DATA | 3 | ROW | 1 | COL. | 4 |

FIG. 10B

| FIELD | SORT | ATTRIBUTE | TYPE |
|---|---|---|---|
| ORG. | 1 | PARENT OF | TEXT |
| AREA | 2 | PARENT OF | TEXT |
| REGION | 3 | PARENT OF | TEXT |
| BRANCH | 4 | PARENT OF | TEXT |
| SALES_REP | 5 | LEAF NODE | TEXT |
| GADGET_UNITS | 1 | BLOCK DISPLAY | $K |
| GADGET_SALES | 1 | BLOCK HEIGHT | INT |
| GADGET_QUOTA | 1 | BLOCK COLOR | $K |
| WIDGET_UNITS | 2 | BLOCK DISPLAY | $K |
| WIDGET_SALES | 2 | BLOCK HEIGHT | INT |
| WIDGET_QUOTA | 2 | BLOCK COLOR | $K |
| GIZMO_UNITS | 3 | BLOCK DISPLAY | $K |
| GIZMO_SALES | 3 | BLOCK HEIGHT | INT |
| GIZMO_QUOTA | 3 | BLOCK COLOR | $K |
| DOHICKEY_UNITS | 4 | BLOCK DISPLAY | $K |
| DOHICKEY_SALES | 4 | BLOCK HEIGHT | INT |
| DOHICKEY_QUOTA | 4 | BLOCK COLOR | $K |

FIG. 11

| BRANCH | REP | GADGET UNITS | GADGET SALES | GADGET QUOTA | WIDGET UNITS | WIDGET SALES | WIDGET QUOTA |
|---|---|---|---|---|---|---|---|
| BALTIMORE | SEIKO | 22 | 107 | 40 | 0 | 0 | 0 |
| BALTIMORE | DAVID | 150 | 714 | 105 | 11 | 260 | 225 |
| BALTIMORE | HERMAN | 6 | 29 | 340 | 0 | 0 | 0 |
| BOSTON | GILLIGAN | 29 | 141 | 540 | 0 | 0 | 0 |
| BOSTON | CHERYL | 1 | 4 | 380 | 0 | 0 | 0 |
| BOSTON | MAURICE | 3 | 14 | 45 | 0 | 0 | 0 |
| BOSTON | GILLIGAN | 54 | 260 | 915 | 4 | 95 | 275 |
| BOSTON | PHILIPPE | 0 | 0 | 0 | 52 | 1129 | 0 |
| HARTFORD | SUMIKO | 53 | 254 | 25 | 7 | 164 | 2075 |
| HARTFORD | JEFF | 48 | 226 | 105 | 11 | 259 | 300 |
| NEW YORK | SHARON | 0 | 0 | 0 | 13 | 304 | 525 |
| NEW YORK | CHERYL | 0 | 0 | 0 | 6 | 147 | 50 |
| NEW YORK | SONIA | 127 | 614 | 450 | 16 | 371 | 775 |
| NEW YORK | SONIA | 9 | 43 | 505 | 0 | 0 | 0 |
| NEW YORK | DANIELA | 52 | 252 | 5 | 0 | 0 | 0 |
| NEW YORK | CARLA | 0 | 0 | 0 | 1 | 25 | 100 |
| PHILADEL | GREG | 158 | 753 | 380 | 0 | 0 | 0 |
| PHILADEL | JULIE | 5 | 24 | 620 | 27 | 652 | 50 |
| PHILADEL | MARK | 0 | 0 | 0 | 0 | 0 | 0 |
| PHILADEL | ALAN | 19 | 91 | 20 | 4 | 96 | 725 |
| WASHIN | KURT | 9 | 44 | 0 | 0 | 0 | 0 |
| WASHIN | TOSHI | 40 | 195 | 180 | 0 | 0 | 0 |
| WASHIN | PABLO | 29 | 142 | 385 | 40 | 882 | 0 |
| WASHIN | STEVE | 96 | 449 | 485 | 13 | 302 | 375 |
| WASHIN | ROCKY | 70 | 333 | 325 | 0 | 0 | 0 |
| HOUSTON | DOLORES | 0 | 0 | 0 | 0 | 0 | 0 |
| HOUSTON | LEIGH | 59 | 278 | 115 | 12 | 292 | 0 |
| HOUSTON | BULLWINK | 0 | 0 | 0 | 3 | 70 | 125 |
| MIAMI | DAWN | 13 | 63 | 165 | 0 | 0 | 0 |

FIG. 12A

```
seed 253,
rows 1,
types     appliances, clothing, electronics, furniture, sundries,
variables      sales(height), avsales=average(sales),
               target, lastyear(disk height),
               pcttarget(color)=sales*100/target,
               pctlastyear(disk color)=sales*100/lastyear divide_by_zero  10000, block message "$%dK sales $%dK average sales %d%% of target %d%% of last year",
               sales, avsales, pcttarget, pctlastyear,
    cell message "$%dK total sales $%dK average sales %d%% of lastyear",
               sales, avsales, pcttarget, pctlastyear,
names
    _1066 _2250 _1492 _4332 _6161 _8086 _6502 _2020 _2525 _1080
    _1411 _1515 _0263 _5595 _1032 _1313 _9595 _1441 _0033 _8055
    _1987 _1992 _9876 _3301 _1652 _1335 _1199 _2244 _1615 _9232
    _1180 _1993 _1546 _1331 _3578 _7432 _1477 _9890 _3521 _1666

(Acme_Mart
[
appliances:
        sales gauss(100, 25),
        target gauss(100, 25),
        lastyear gauss(80, 25),
clothing:
        sales gauss(300, 35),
        target gauss(325, 35),
        lastyear gauss(270, 25),
electronics:
        sales gauss(150, 15),
        target gauss(150, 15),
        lastyear gauss(180, 15),
furniture:
        sales gauss(50, 10),
        target gauss(80, 15),
        lastyear gauss(80, 15),
sundries:
        sales gauss(100, 10),
        target gauss(100, 10),
        lastyear gauss(100, 15),
]
(Eastern
[
appliances:
        sales gauss(200, 25),
]
(Baltimore        store1  store2)
Boston            5
Hartford          1
New York          6
Philadelphia      4
Washington DC     5
)
(Southern
Houston           3
Miami             6
NewOrleans        7
)
(Central
```

```
Chicago      5
Detroit      6
Milwaukee    2
StLouis      4
)
(Western
Bakersfield  8
Denver       4
LosAngeles   5
Phoenix      3
SaltLakeCity 2
SanFrancisco 7
Seattle      5
)
```

METHOD AND APPARATUS FOR NAVIGATION WITHIN THREE-DIMENSIONAL INFORMATION LANDSCAPE

CROSS REFERENCE TO RELATED APPLICATIONS

This patent application is related to application Ser. No. 08/042,801, entitled A METHOD AND APPARATUS FOR DISPLAYING DATA WITHIN A THREE-DIMENSIONAL INFORMATION LANDSCAPE, by Steve Strasnick and Joel Tesler, filed concurrently herewith, which is incorporated herein by reference.

SOFTWARE MICROFICHE APPENDIX

The disclosure for this patent application includes a software microfiche appendix comprising 6 microfiche consisting of 286 frames.

BACKGROUND OF THE INVENTION

1. Field of the Invention

The present invention relates generally to graphical displays and in particular to the navigation within a three-dimensional graphical display space.

2. Summary of the Related Technology

Data and information are fundamentally different from each other. Data, presented as rows and columns of numbers and text, typically is raw and undifferentiated. To be useful, raw data must be organized into intelligible categories. Moreover, data is passive by nature. A user must act on it. Data does not interact with the user. It does not engage the user or grab his attention. Data can also be obscure, in the sense that its relevant attributes and relationships are hidden. Normally, the user must conduct his own investigation to discover such data relationships.

Information, on the other hand, is organized, active, and accessible because it is presented within a representational scheme that supplies meaning and context. That is, data is grouped into relevant information categories which can be more easily comprehended.

One approach to increasing comprehension of data is data visualization. Data visualization utilizes tools such as display space plots to represent data within a display space defined by the coordinates of each relevant data dimensional axis. Two-dimensional (2D) plots map data into an x-y axis coordinate system. 2D scatter plots are utilized to portray the characteristics of diffuse data. 2D line plots trace the movement of a distinct phenomenon through the x-y space. Three-dimensional (3D) visualization techniques map data into a 3D space with data points filling the visualization space.

3D analogs exist for the 2D scatter plots, for example, 3D color space mappings. 3D color space mappings are analogs as well for 2D line plots in which characterized data are collapsed into specific shapes in 3D display space. For example, a 3D representation can be utilized to graphically represent the temperature gradient within the earth's crust. These 3D mappings work well with data that naturally congeals into distinct objects and shapes, but not so well with data that is by nature diffuse and abstract, with no innate relationship to physical objects. For example, flight simulators map and display physical objects well, however, the inventors are aware of no application which maps data into a navigable landscape of conceptual space. Thus, there is a need for a system that enables a user to represent diffuse and abstract data with intelligible display objects.

Another attempt at data visualization through a 3D mapping is illustrated in the CAM Tree developed by Xerox PARC and described by M. Clarkson, in An Easier Interface, Byte Magazine (February 1991). The CAM Tree is essentially a three-dimensional Rolodex™ with limited ability to represent anything more than the hierarchical structure of a data base. The attributes of the data remain hidden. Thus there is a need for a robust 3D data representation method and apparatus.

SUMMARY OF THE INVENTION

The present invention comprises a method and apparatus for defining a set of data attributes; mapping the set of data attributes into objects displayed within a three-dimensional landscape in accordance with a simulation language; and navigating through the three-dimensional landscape. The present invention further comprises a method and apparatus for displaying a pluratlity of objects having a common data attribute in the landscape as a plurality of columns of different heights wherein a variation of in the height of the columns represents a variation in the common data attribute. The present invention further comprises a method and apparatus for displaying a plurality of objects as columns in a landscape wherein a first column representing an object is displayed in front of a second column; and reducing a width of a first column so that the second column in the landscape located behind the first column is not occluded by the first column.

The present invention further comprises a method and apparatus for displaying a disk with a radial axis coincident with a longitudinal axis of a column; and adjusting a height of the disk with respect to the top of the column to indicate a comparison between data attributes. The present invention further comprises a method and apparatus for displaying a plane representing a threshold value within the landscape; and displaying a column underneath the plane when the column represents a value below the threshold value represented by the plane.

The present invention further comprises a method and apparatus for displaying a pedestal upon a plane within the landscape; selectively displaying the columns upon the pedestal; and altering a color of the pedestal to represent a summation of a data attribute of the columns displayed upon the pedestal. The present invention further comprises a method and apparatus for displaying a pedestal upon a plane within the landscape; selectively displaying the columns upon the pedestal; and altering a size of the pedestal to represent a summation of a data attribute of the columns displayed upon the pedestal.

The present invention further comprises a method and apparatus for displaying data as a plurality of blocks in the landscape; and displaying icons on the blocks to indicate data attributes wherein the data attributes include textual, executable, and audible attributes. The present invention further comprises a method and apparatus for enabling a user to interact with a data set represented by an object displayed in the landscape. The present invention further comprises a method and apparatus for altering the landscape so that more objects are displayed within a portion of the landscape as a navigator approaches a portion of the landscape. The present invention further comprises a method and apparatus for altering a displayed object shape so that the displayed object appears as a three-dimensional object when a navigator is close to the displayed object and changes into a two-dimensional object as the navigator moves a predetermined distance away from the object. The present invention further comprises a method and apparatus for displaying a three-dimensional objects of similar height as two-dimensional objects on the landscape as a navigator moves a predetermined distance away from the objects.

The present invention further comprises a method and apparatus for removing an object from the landscape as the navigator moves a predetermined distance away from the object. The present invention further comprises a method and apparatus for presenting a preference panel to a user; accepting display attribute values entered in the preference panel; and mapping the display attribute values into display attributes for the navigable display space.

The present invention further comprises a method and apparatus for displaying a cursor in a two-dimensional overview of the display space; enabling a user to manipulate the position of the cursor within the overview; and manipulating a view of the display space in accordance with the position of the cursor within the overview. In accordance with a simulation language. The present invention further comprises a method and apparatus wherein the landscape comprises objects laid out on a plane. The present invention further comprises a method and apparatus for displaying a landscape; displaying data objects arranged within the landscape; and changing a display of the landscape as a navigator browses through the objects within the landscape.

The present invention further comprises a method and apparatus for displaying the objects in a hierarchy; accumulating data at each level of the hierarchy so that each level represents a sum of levels below it in the hierarchy; and normalizing sizes of the objects displayed at each level of the hierarchy independent of the size of objects existing at other levels in the hierarchy.

BRIEF DESCRIPTION OF THE DRAWINGS

FIG. 10A illustrates a tabular representation of displayed data as sorted by type and attribute.

FIG. 10B illustrates a tabular representation of displayed data as sorted by type and attribute.

FIG. 11 illustrates a tabular representation of data values represented in display space.

FIGS. 12A and 12B are a sample of the simulation language, written in C, which is utilized to map data and data relationships into information objects.

FIG. 13 is a preferred hardware embodiment for the present invention.

DETAILED DESCRIPTION OF THE PREFERRED EMBODIMENT

Overview of the Preferred Embodiment

Defining the Information Landscape

The present invention will be further clarified by consideration of the following description, drawings and claims.

A preferred embodiment of the data navigation and visualization method and apparatus of the present invention supplies its own categories of meaning by enabling an operator to collapse data into discrete intelligible display objects even when the data does not naturally coalesce into distinct objects or patterns. 2D and 3D bar charts have attempted this technique; however, they are limited in their dimensionality and their ability to represent structural relationships and data attributes. Moreover, bar charts present a limited amount of perceivable information simultaneously to the user. Thus, bar charts provide a limited "information bandwidth".

The information landscape data representation of the present invention overcomes the problems associated with bar charts and other related techniques utilized in the past. The present invention provides an information landscape which extends the 3D bar chart paradigm into a navigable 3D display space. The navigable display space data representation provides for increased information bandwidth. That is, the information landscape greatly increases the amount of information which can be simultaneously viewed and perceived by the user. The information landscape comprising an aggregation of displayed data objects and provides for added dimensionality through additional containment and structuring topology.

In one example of a preferred embodiment, the 3D information landscape paradigm is utilized to provide an information landscape, in which collections of 3D bar charts are grouped and interconnected in a topology which represents the data relationships as a spatially distributed representation upon an extended navigable information landscape.

Components of the Information Landscape

Figure 1:
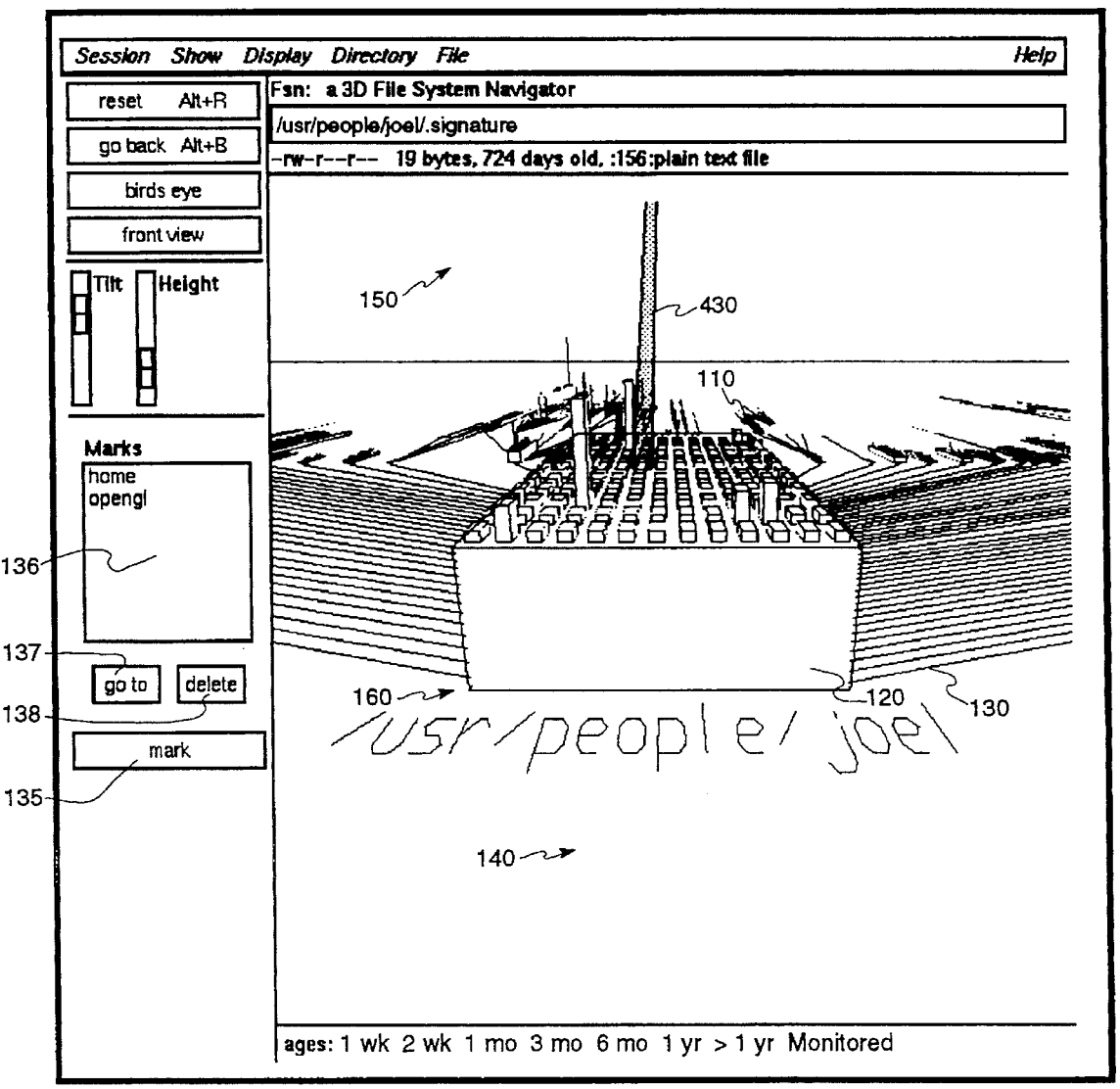
FIG. 1 is an example of a preferred embodiment illustrating an aggregation of data objects spatially distributed to represent data relationships.

The aggregation of objects forms an information landscape as shown in FIG. 1 which comprises the following general categories of data representation components: data blocks 110, cells 120, connectors 130, ground 140, sky 150 and topology 160. A data block 110 is the basic unit of individual data. A data file appears as a data block 110 within the information landscape. The data block's attributes are represented by a mapping of the data block's attributes to visible and audible characteristics such as height, shape, color, saturation, sound, text, animation, icon, or some other perceptible sensation.

A cell 120 is the basic organizational unit or container. A cell 120 represents a particular relationship between the data blocks 110 that it contains. A cell's attributes can be represented similar to the attributes for a data block 110 utilizing the same mapping to visual and other perceptible sensations.

Connectors 130 are presented as multidirectional interconnecting lines between the cells 120. Connectors 130 represent the contextual relationships between cells 120. Thus members of a cellular family, for example, parents and children, are connected visually by connectors within the information landscape.

The ground plane 140 within the information landscape represents a common surface plane upon which the cells 120 and connectors 130 are presented. Informational objects, such as data blocks 110, cells 120, and their connectors 130 may be sorted and laid out according to some lexical ranking, such as alphabetical order or size. The sky 150 represents a back plane within the information landscape upon which additional attributes can be projected.

The topology 160 or spatial relationship between the cells 120 and data blocks 110 in the landscape represents the structural relationships that exist in the underlying data. For example, the underlying data relationship may be hierarchical or relational. However, the user may represent any underlying relationship he desires to express in a 3D graphical display space. Thus, the present invention is multifunctional. It may be utilized to represent any underlying relationship in numerous ways, limited only by the imagination of the user.

Utilizing the Information Landscape

The information landscape is navigable. A user may move around or navigate within the 3D data representation to alter his perspective and view of the displayed representation of the data. Thus, a user may be referred to as a navigator. The navigator is actually stationary, and his view of the display space changes to give him the sensation of moving within the 3D graphical space. Thus, we speak in terms of the navigator's perceived motion when we refer to changes in his view of the display space. As the user moves, his view of the data changes accordingly within the 3D data representation. The main navigation modes are browsing, trekking, monitoring, towing, searching, and data manipulating.

In the illustrated embodiment, the present invention enables a user or navigator to browse within the information landscape. Browsing entails scanning the information landscape in search of points of interest, without a particular focus.

The present invention enables navigator trekking as well. Trekking entails navigating to a particular, intended destination within the information landscape. The present invention also enables monitoring. Monitoring entails scanning a particular area with respect to the behavior of some parameter of interest. The present invention also enables touring. Touring entails a specified sequence of travel between designated destinations. The present invention also enables searching. Searching entails scanning the information landscape in search of a particular data item, data attribute or data relationship. The present invention also enables data manipulation. A navigator may actively operate on the data through his interactions with it in the information landscape.

An Example of a Preferred Embodiment

A File System Navigator

Figures 12B, 13:
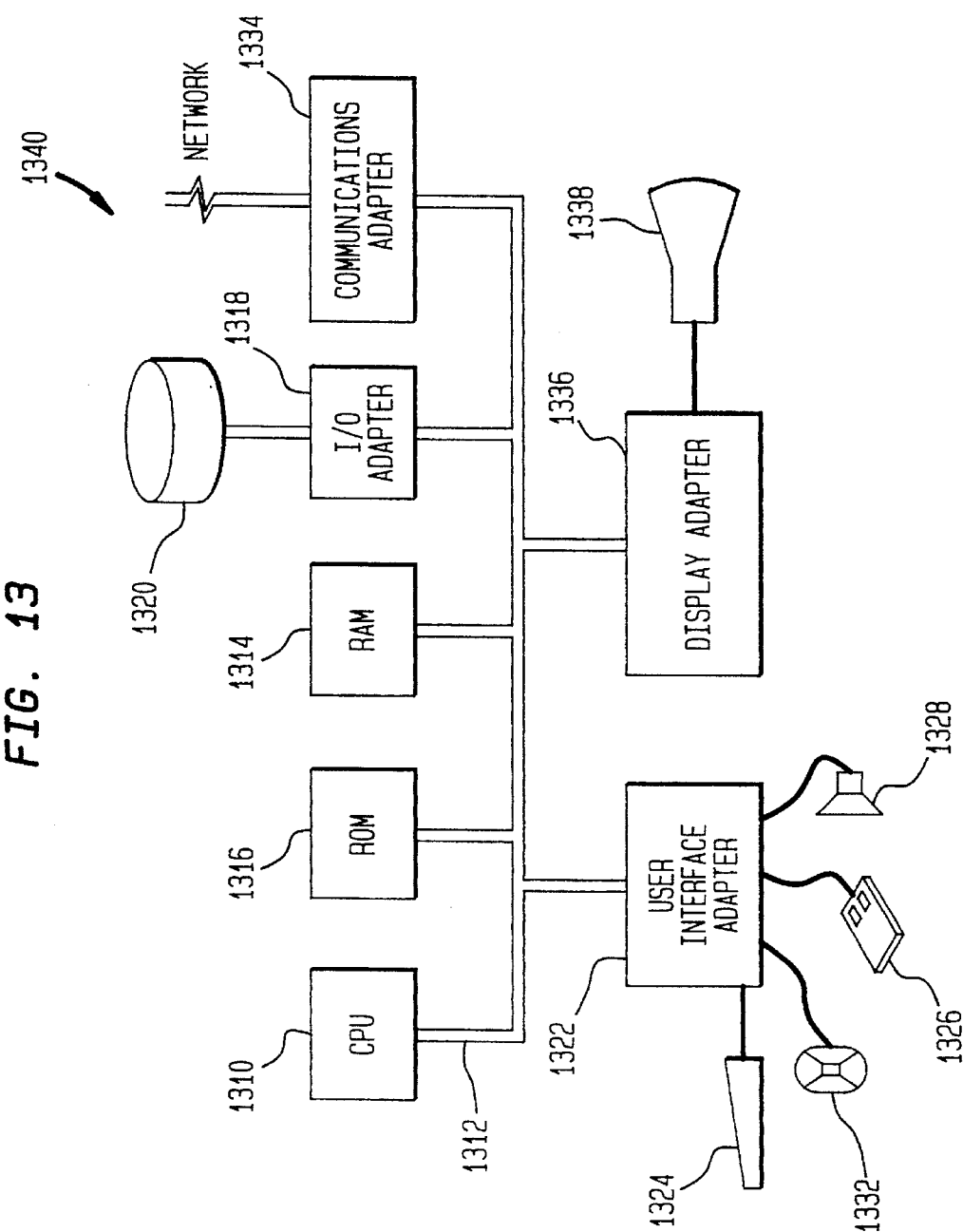

Referring now to the drawings, the details of the preferred embodiment are schematically illustrated. In FIG. 13 the number 1340 designates generally a computer system. A representative hardware environment for the present invention is depicted in FIG. 13, which illustrates a suitable hardware configuration of a computer system 1340 in accordance with the present invention.

The computer system 1340 has a central processing unit 1310, such as a conventional microprocessor, and a number of other devices interconnected via a computer system bus 1312. The computer system 1340 comprises a random access memory 1314 (RAM), a read only memory 116 (ROM), an I/O adapter 1314 for connecting peripheral devices such as nonvolatile memory devices such as disk units 1320 to the bus 1312, a user interface adapter 1322 for connecting a keyboard 1324, a mouse 1326, a speaker 1328, a microphone 1332, and/or other user interface devices (not illustrated) to the bus 1312. The computer system 1340 may also have a communications adapter 1334 for connecting the bus 1312 to a data processing network 1330 and a display adapter 1336 for converting the display information from the bus 1312 to video information to drive a display device 1338.

An embodiment of the present invention has given good results in practice using an IRIS Indigo™ computer manufactured by Silicon Graphics, Inc. of Mountain View, Calif. It will be apparent to those skilled in the art that other types of workstations, computers, and digital or analog processing equipment could be used.

In one example of a preferred embodiment, a file system navigator (FSN) is presented. In the FSN, the topology is a hierarchical modeling of a data file directory. In the embodiment illustrated in FIG. 1, cells 120 are displayed as 3D square pedestals representing directories in which the height or color of a pedestal represents the aggregate size of the files contained within the directory represented by the cell. The FSN utilizes connectors 130 to represent the parent-child relationship between data objects appearing in display space.

In a preferred embodiment, data blocks 110 may be utilized to represent files. The files attributes are perceptibly represented. For example, a file's attributes comprising size, type, and age are represented as follows: the file itself is represented by a 3D column 110 standing on a 3D pedestal 120. The height of the column 110 and pedestal 120 is proportional to the file and directory size, respectively. Icons or text appear on the column 110 to represent the file's type. The column's color represents the file's age. Data attributes may be represented by other perceptible means as well. A particular file attribute, for example, a data file's confidentiality level, may be represented by an audible tone, enabling confidential files to emit a warning tone when the navigator looks into or enters a confidential file. Any data attribute may be represented by any perceptible means within the display space. The landscape or other chosen data representation scheme is mapped to the data, and its attributes and relationships, by means of a simulation or script language as illustrated in FIG. 12A and 12B.

In a preferred embodiment, the FSN ground plane represents a numerical value or threshold. Thus, a data object's height above the ground plane represents the object's relative size. A data object may even be displayed below the ground plane if the displayed data object's size is less than the threshold value set for the ground plane. A dashed line on the ground plane is utilized to represent a data object below the ground plane.

In a preferred embodiment, the FSN cells and data blocks, representing files and their directories, can be manipulated. For example, cells representing directories can be sorted alphabetically at each hierarchy level. Similarly, sub cells representing subdirectories, or data blocks representing files can be sorted alphabetically within each cell.

In a preferred embodiment, the FSN enables a user to examine, edit, print, or move files by manipulating displayed representations of data objects. The FSN dynamically responds to changes in the file system. For example, if the aggregate size of the files contained within a cell 120 is represented by a particular color, the color of the cell 120 may change as files are added or deleted within the directory represented by the cell 120, thus changing the aggregate size of the directory represented by the cell's color.

An Alternative Example of a Preferred Embodiment

A Sales Database

Figure 2A:
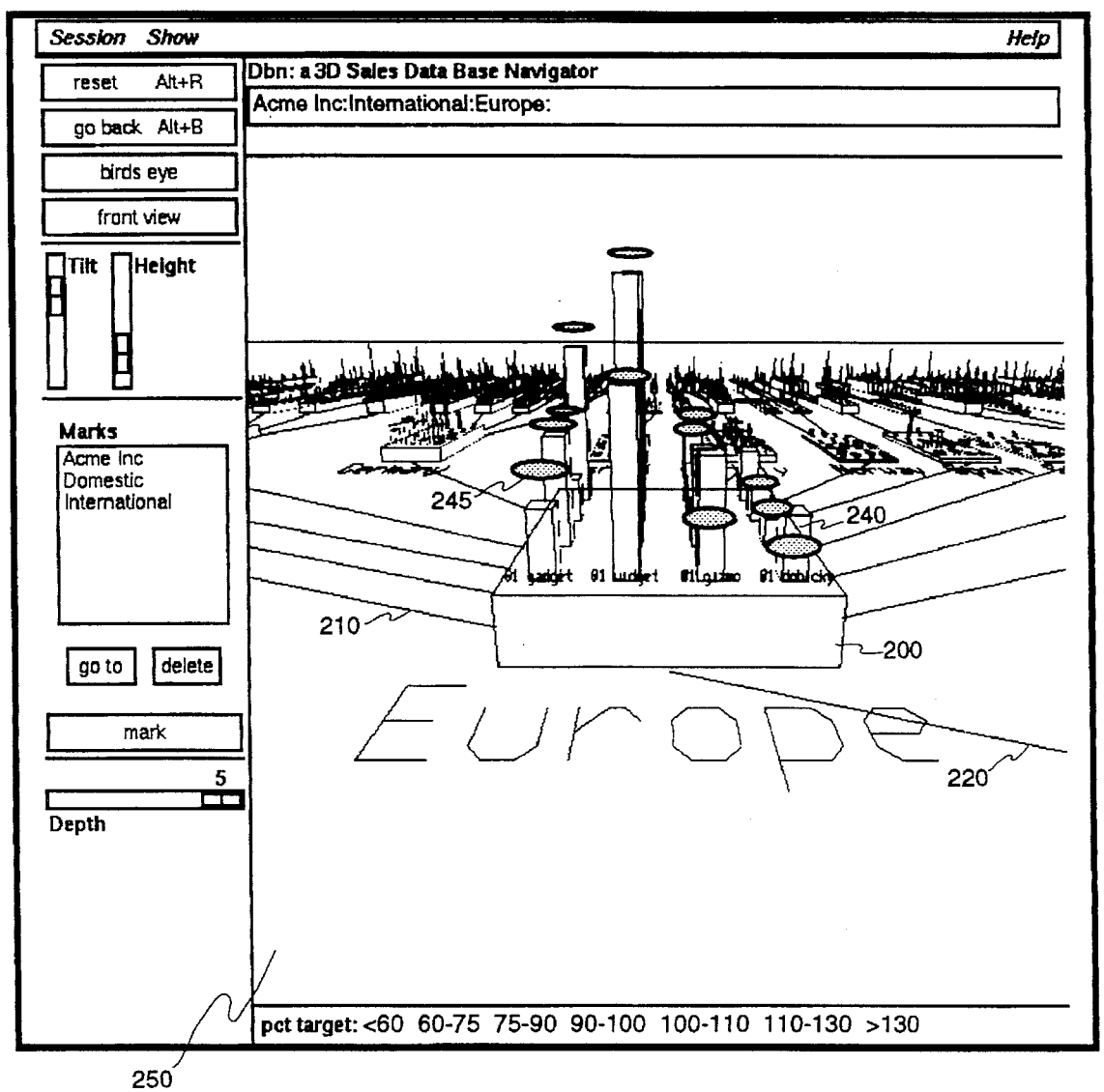
FIG. 2A is a example of a preferred embodiment illustrating a topology representing a hypothetical sales organization.

Another example of a preferred embodiment is shown in FIG. 2A. In this example, the illustrated topology represents a hierarchy within a hypothetical sales organization ACME. The hierarchical organization ranges from worldwide departments down to individual salespersons. Each cell 200, subcell, or data block 240 represents an individual organizational entity, e.g., a country, a sales office, or a salesperson.

The cells are interconnected by connectors 220 according to their organizational structure. The data blocks 240 represent cumulative sales information for all subcells and data blocks 240 belonging within a particular cell 200. The visible attributes of the data objects presented in the information landscape to represent the informational attributes of the data, for example, cost, number of systems sold, duration of sale, discount, etc. are represented by, for example, but not limited to, color, height, shape, sound, and topology.

In FIG. 2, the European cell 200 represents the parent cell of the European sales organization. The various European sales offices may be located by following connectors 210 emanating from the sides of the cell 200. A connector 220 connects the European cell 200 to its parent cell.

In this example, the cells 200 which are presented resting upon a ground plane 250, referred to as ground cells, are fundamental building blocks. Subcells, or data blocks 240 rest upon the ground cells. Containership relationships are represented by displaying the subcells and data blocks 240 resting upon the cell 200 in which they are contained. Ground cells 200 can be sorted based upon their membership in a particular sales organization or any criteria selected by the user. Data blocks can be organized by type of sale at the user's discretion. Leaf cells, those cells which exist at the atomic end of a hierarchical data tree structure, contain independent data. Non-leaf cells contain the aggregation of their children's data. Non-leaf cells, therefore, do not contain independent data, although this option is available to the user. Lower level cells are examined by the user for the details of the data contained therein. Animation and multiple windows are utilized to demonstrate changes in the data over time. This functionality enables the user to observe changes over time which, for example, facilitates comparison of quarterly sales data.

Cumulative Data Representation

The file system navigator represents an example of non cumulative data. Although there is a parent-child relationship between the cells, the data blocks in the child cells do not affect the data blocks in parent cells. For example, in the file system, each data block represents a single file; the size of files in child directories does not affect the size of files in parent directories. In a non cumulative environment, computation of the attributes of data blocks should be base on all data blocks in the environment. For example, the tallest file should be represented by the tallest block.

The sales data base navigator represents an example of cumulative data. In each cell, the data blocks represent the sum of the same data in the children of that cell. Increasing the value of a data block in a cell will increase the value of the same data block in all its ancestors. For example, if a salespersons has larger sales, that salesperson's office does as well. With cumulative data, it is often best to calculate data block attributes independently at each level. For example the height of the block representing the best salesperson would be equal to the height of the block representing the best sales office. Salespeople are compared against other sales people, but not against sales office. By limiting the scope of the data to individual levels, it eliminates the problem of data at high levels overshadowing data at low levels. For example, even the best sales people sales will be overwhelmed when compared against the total company sales.

For example, in the sales data base example, at the individual level, a row of sales persons are presented as data objects. The sales person with the largest sales volume is represented as the largest object in the data representation. The size of the objects that represent the rest of the sales persons are shown relative to the size of the object representing the sales person with the largest sales volume. The next level in the sales data base is the department data base. The department level represent the sum of all the sales volumes for sales persons in the department, thus these cumulative sales figures are much larger than the sales volume for any one sales person. The heights for the departments are normalized so that their sizes are relative to the size of the object representing the department with the largest cumulative sales volume. Thus the object sizes on each level are normalized with each other in this example. Sizes between levels are not related in size.

In some cases, it is possible to mix both types of models. For example, the file system data blocks represent individual files which do not cumulate. However cells can represent the total size of all files within the cell which could cumulate.

Navigational modes

Referring to FIG. 1, a navigator may traverse the information landscape in various ways in accordance with his intentions with respect to the data. In a preferred embodiment, several navigation modes are provided. The first navigational mode is free flight. In free flight, the user or navigator utilizes a mouse as a 3D joystick to navigate within the information landscape. Free flight navigation starts from an initial location established by an initial mouse location which remains fixed until reset.

In the free flight navigational mode, a set of cross hairs appears at the initial mouse location when the navigator presses or clicks a mouse button. The cross hairs establish a visual reference for the navigator. The current mouse location is displayed to indicate the relationship between the current mouse location and the initial mouse location. A navigator's perceived speed as he traverses the information landscape is proportional to the distance he moves the mouse from its original location as indicated by the mouse cross hairs. Utilizing the shift key in conjunction with the mouse enables use of the third dimension which facilitates navigational fine tuning.

Figure 3:
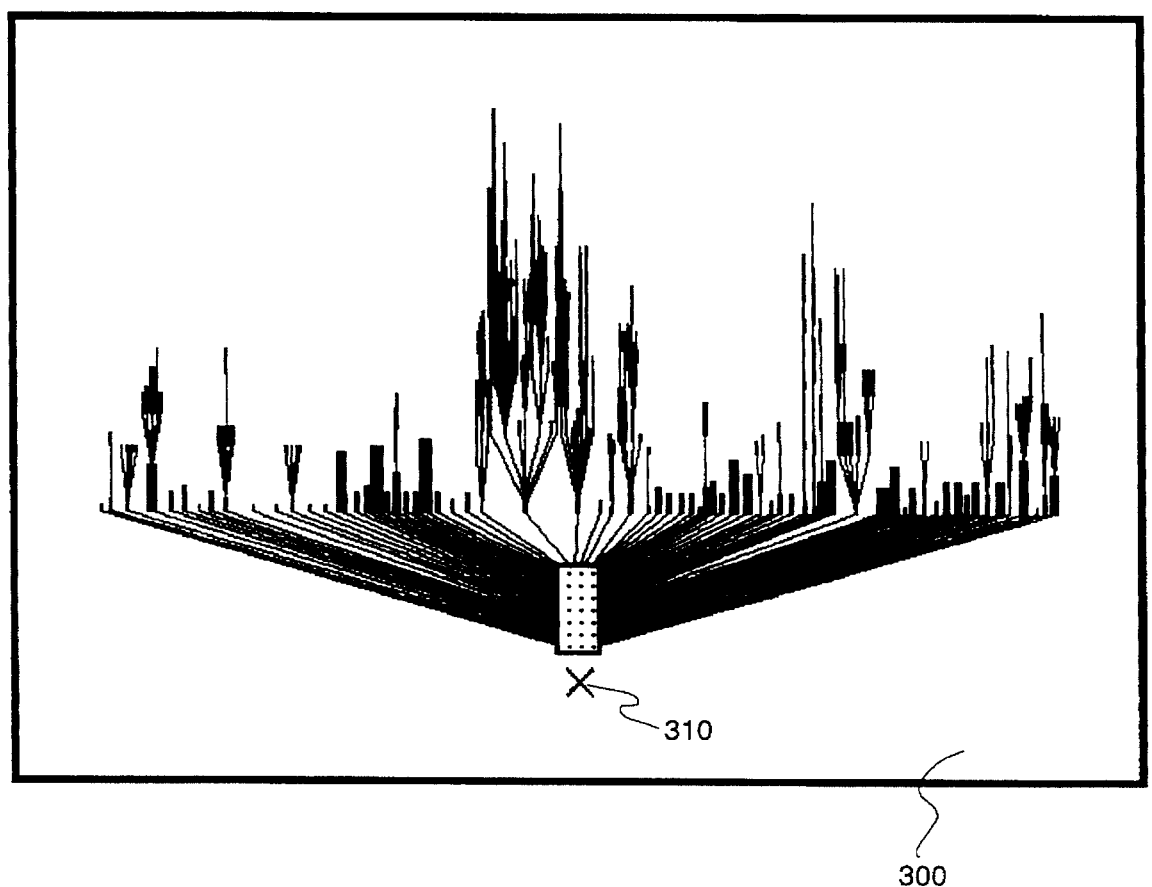
FIG. 3 is an example of a two dimensional overview of the 3D information landscape in a preferred embodiment.

Turning now to FIG. 3, the second navigational mode provided in the preferred embodiment is zoom navigation. Zoom navigation enables a navigator to automatically zoom an object when the user presses the mouse button over an object. The Zoom navigational mode thus provides an automatic pilot to navigate toward an object without navigational input from the user. The navigator simply clicks the mouse over a desired destination or object appearing in the overview window. Clicking on an object in the overview window enables a navigator to travel to the selected object automatically. Zoom can also be used within the main display window by clicking on any object in the main window Zoom. Zoom navigation is particularly useful in large or complex information landscapes. Zoom navigation enables a navigator to traverse large distances in the landscape very quickly. Zoom navigation also enables a navigator to take advantage of his recollection of the landscape topology and quickly access data objects that he is familiar with in the landscape.

The third type of navigation provided in the preferred embodiment is marker navigation. Marker navigation enables a navigator to mark particular locations and to return to them automatically when desired. Thus, a navigator may return to a marked location, as a point of reference or as a point of interest.

Figure 2B:
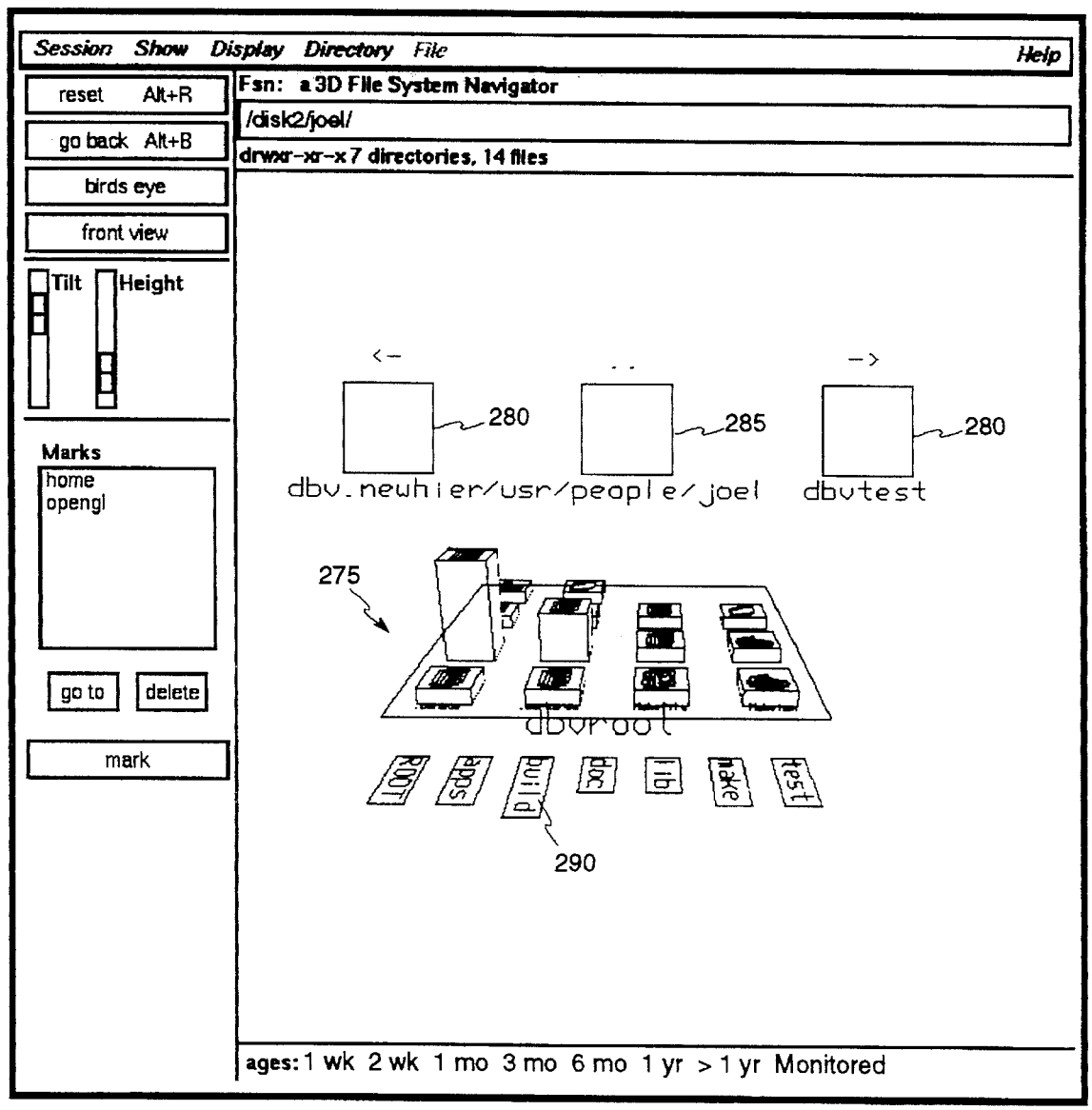
FIG. 2B is a example of a preferred embodiment illustrating warp mode navigation.

The fourth type of navigation is warp navigation. Warp navigation entails zooming into a particular data object for close in viewing of the data object. Warp navigation enables a navigator to focus upon a single cell 275 of interest as shown in FIG. 2B. Hypedinks 290 enable a navigator to warp to the hierarchical dependents or children of the cell displayed. The hyperlinks 280 enable a navigator to warp to the siblings of the displayed cell 275. The hyperlink 285 enables a navigator to warp to the parent of the displayed cell 275.

Figure 6:
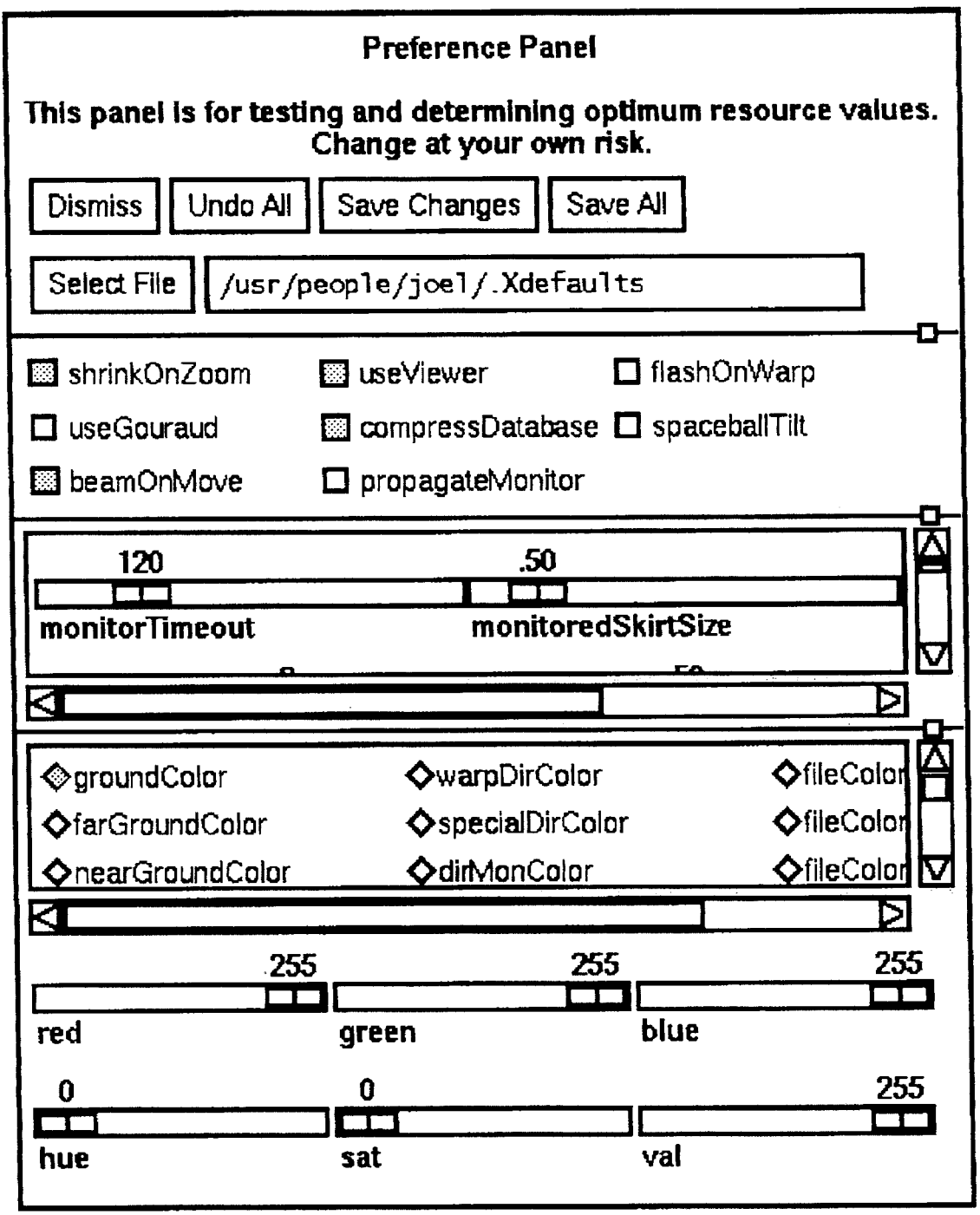
FIG. 6 is an illustration of a preference panel presented in a preferred embodiment.

Other navigational modes are provided in an alternative embodiment. For example, a user may query a relational or hierarchical data base represented in the informational landscape and sequentially navigate to each data object responsive to the query. Navigation modes are programmable and may be configured and altered by a simulation language as illustrated in FIGS. 12A and 12B and by the preference panel, illustrated in FIG. 6, which are discussed below.

Visual Richness

Good visual appearance and realism are valuable. They provide a data representation paradigm which is pleasant to use, enhances viewer discrimination, and makes the system feel more familiar and lifelike to the user. Moreover, realism provides an illusion of space, which helps to engage and focus the viewer. The system feels more sophisticated so that the user performs his tasks with greater concentration.

Parameter Tuning

Figure 5A:
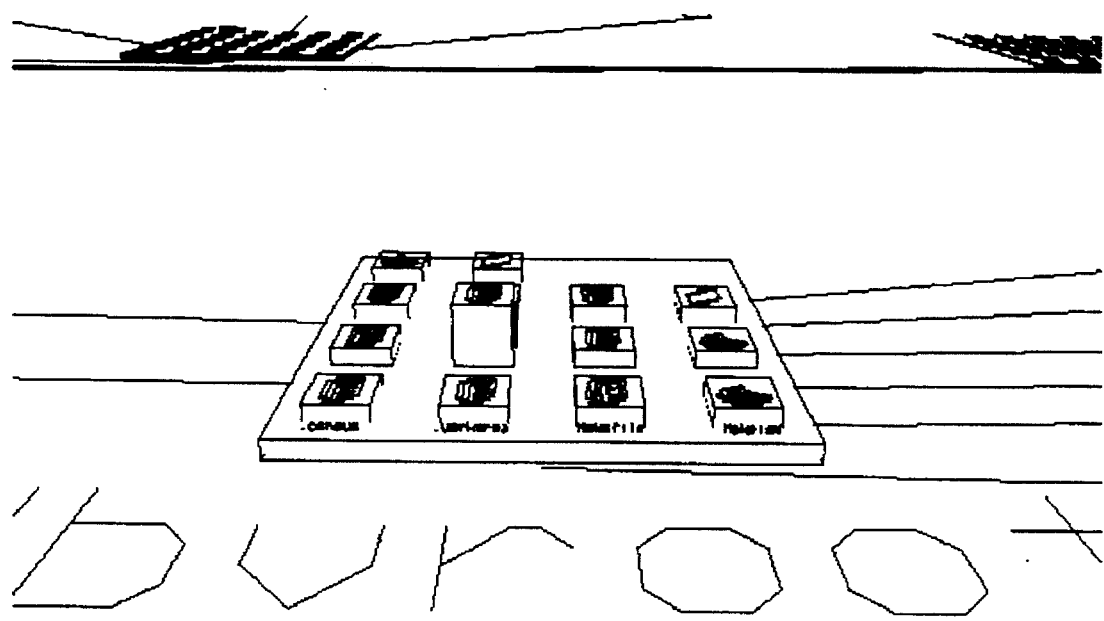
FIG. 5A illustrates a preferred display space without artificial perspective.
Figure 5B:
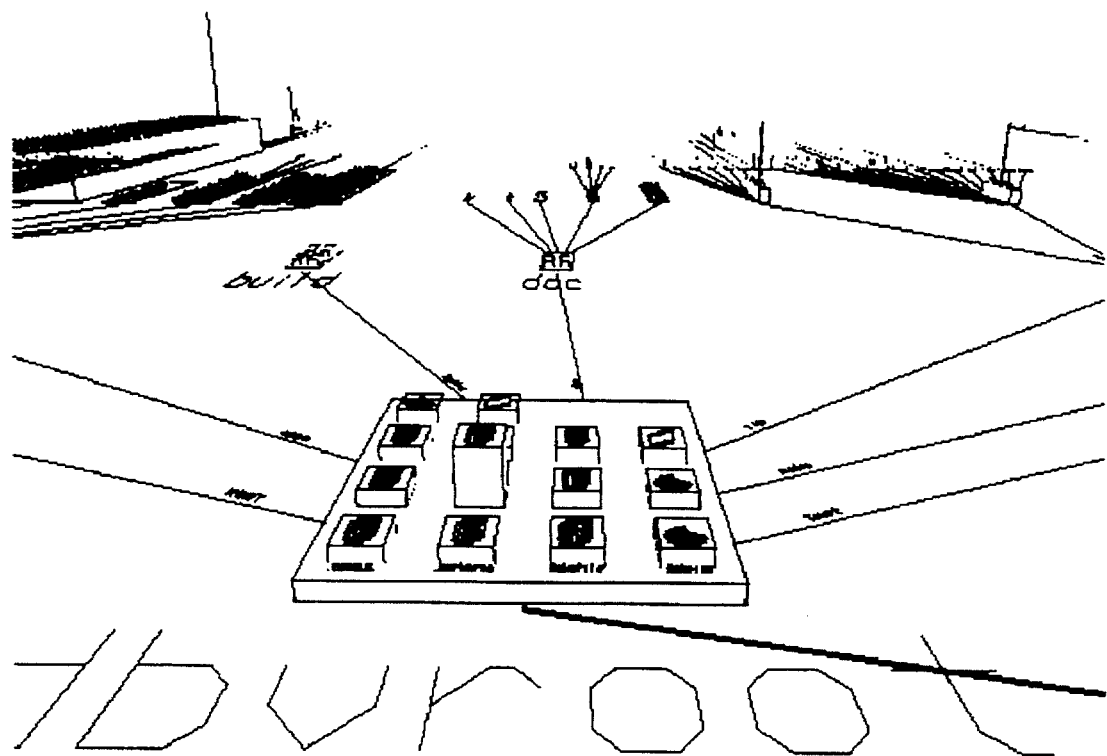
FIG. 5B illustrates a preferred display space with artificial perspective.

A 3D presentation is more complex than a 2D presentation because, unlike 2D, in 3D a change in one direction precipitates a change in the other directions as well. This is especially true when utilizing the artificial perspective of the present invention as shown in FIG. 5B. As discussed below, in the artificial perspective, the x dimension is compressed inversely proportional to a selected power of the perceived distance between the navigator and the objects he views. Thus, objects viewed in the distance appear very narrow as their x dimension or width is highly compressed at greater distances.

Color selection for the representation of attributes is also a factor in the data object representation. From an ergonomic standpoint, the preferred colors are distinct, yet present a pleasing appearance when presented in combination. Connectors between objects are easily visible, but without dominating the user's view of the information landscape. In a preferred embodiment, a preference panel is provided to enable the user to change the information landscape display parameters to suit his personal taste.

In the illustrated embodiment over one hundred "X window system" resources are provided that allow specific configuration of the behavior of the application. The computer includes a memory and a processor as illustrated in FIG. 13. Boolean resources are provided to set flags, for example, to indicate whether to use Gouraud shading or flat shading, and value resources are provided to calculate, for example, the distance between individual informational objects representing directories which are displayed within the information landscape. The preference panel utilized to set values for these resources.

Color resources enable the user to select the color of the ground and sky. A user may select from preconfigured landscapes by combining several parameters, or he may create his own personal palette of display colors from selected parameters.

Although the FSN and the sales data base were chosen as an example of the preferred embodiment, alternative embodiments may represent other types of data and data relationships as well. For example, the present invention may represent general directed acyclic graphs and network graphs. Any relationship may be represented by the method and apparatus of the present invention. The applications are limited only by the imagination of the user. In a preferred embodiment, the FSN utilizes Z-buffering and RGB support. A Silicon Graphics File Activity Monitor (FAM) is installed on the preferred system in the preferred embodiment as well. The FAM can be obtained as part of the Silicon Graphics operating system.

It is not desirable to update the entire data base representation every time a data item changes. This would be time consuming in a large data base and would impact the performance of the system and the integrity of the data presentation. Thus, two concepts are utilized to update the data base representation in a preferred embodiment: (1) Data representations are updated when the representative object is visited or selected on the display screen, and (2) certain objects may be selected, preferably less than all of the objects in the data base, for continuous updating.

Subsequent FSN invocations may utilize a previous file system layout, including a navigator's position, displayed windows, and marked positions. In addition to the name of the directory, the FSN may also utilize a landscape specification, which describes the layout of objects displayed within the graphical display space. There are several landscape displays available which can be chosen via the landscape argument. The default landscape is grass, which comprises a daytime sky and grassland. Other available landscapes are ocean, desert, and space. The user can also design his own landscape by manipulating the color resources as discussed previously.

Selecting and Highlighting Data Objects

Figure 4A:
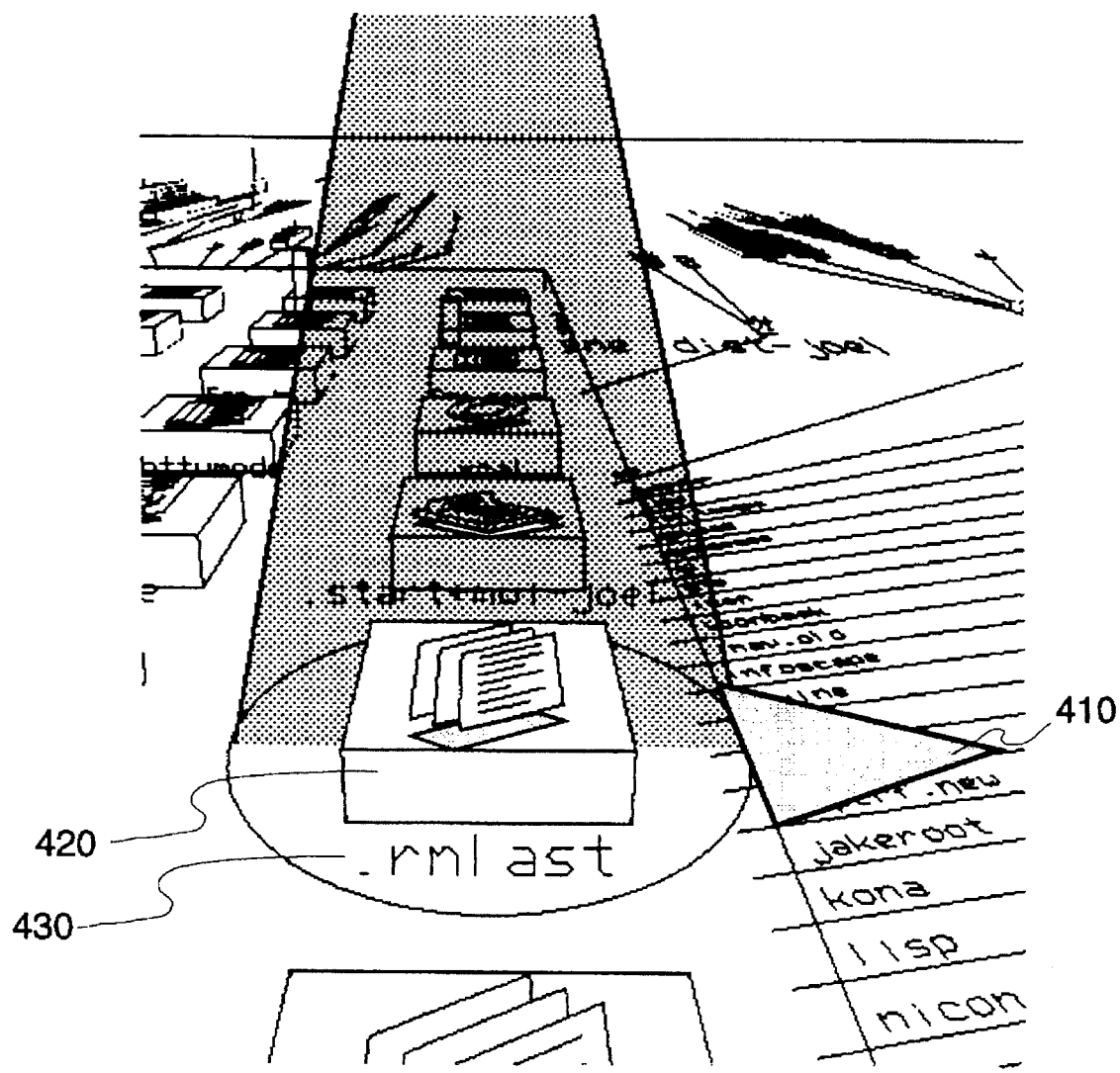
FIG. 4A illustrates a preferred display space with a spotlight and a hyperlink arrow.
Figure 4B:
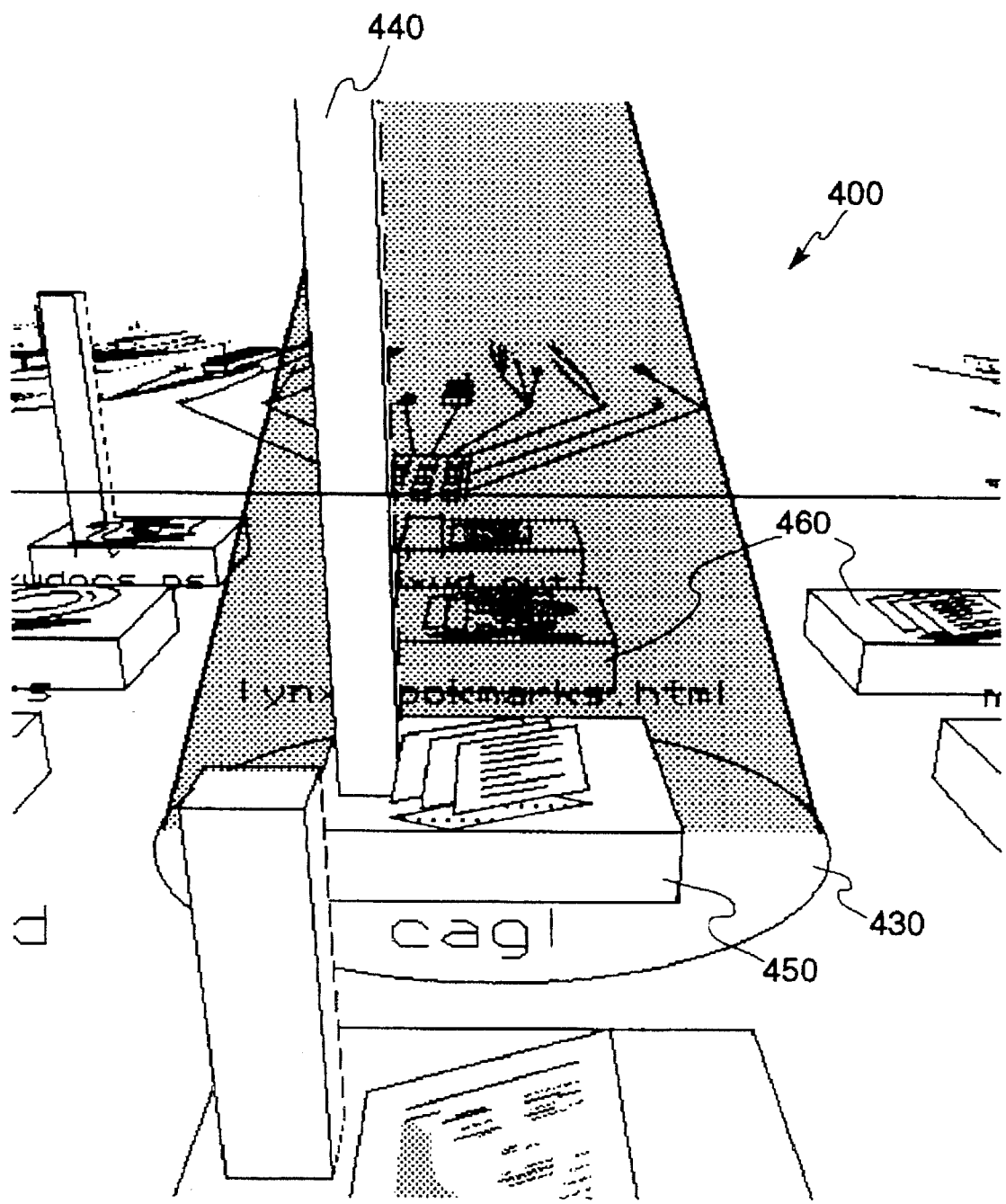
FIG. 4B illustrates a preferred display space with height shrinkage.

As a navigator traverses the information landscape the mouse cursor moves over various data blocks and cells. Preferably the present invention highlights these data blocks and cells and displays the name of a selected data block or cell in the upper left hand corner of the selected data object as the navigator passes over it. Activating the left mouse button while an data object is highlighted selects the highlighted data object. When a cell is selected, the system brightens or highlights the selected cell and the connector line leading to it. A spotlight 430 may also shine down on the selected cell from a point above the landscape, as illustrated in FIGS. 4A and 4B. Selecting a cell or data block also zooms the navigator's view into the selected cell so that it is visible at close range. If a data block is selected and the navigator wants to see the entire contents of the cell containing the data block, the navigator need only select the cell by clicking the mouse on the desired cell to view its contents.

Alternatively, the user may select a cell or data block without zooming to it by utilizing shift-left mouse. The user may also select a cell by clicking on the connector line leading to the cell. However, if a cell is already selected, clicking on its connector line causes the system to zoom to the parent of the selected cell, thus facilitating progenitor determination or child-parent hierarchical traversal.

Selecting a cell also causes the system to check the update the cell for changes in the underlying data by enabling FAM on the cell. Cells may be marked so that they are continuously monitored by FAM and thus continuously updated. It is not practical to continuously update every element of a large data base due to the adverse impact on system performance and integrity of the display as discussed above.

Double clicking the left mouse button when the mouse cursor is positioned on a directory warps the navigator's view, which shows him only information for the selected directory. Warp mode will be discussed more below. Double clicking on an executable file executes or launches the executable file or places the file into a viewer if it is a source file. The user can also utilize "Alt-double click" which launches a full editor rather than the a viewer to examine a data block.

As shown in FIG. 4A, when a file at the edge of a displayed cell 420 is selected, an adjacent arrow 410 appears to indicate the presence of the adjacent cell edge. Clicking on this arrow 410 enables the navigator to automatically zoom to the first data block in the hierarchical order, that is, the next data block in the next row or the last data block on the previous row. The arrow is a hyperlink to other data blocks within the cell. In a alternative embodiment, the hyperlink is a link to other related cells.

Moving Around

The navigator can move around without selecting any object or entering zoom mode navigation. Pressing the middle mouse presents a set of cross hairs. Moving the mouse away from the cross hairs while engaging the middle mouse button changes the navigator's perceived view and perceived velocity so that he appears to travel in the direction in which he has moved the mouse. Moving engaging the left and right mouse buttons changes the navigator's perceived view so that he appears to move left and right, respectively. Moving the mouse forward and backward changes the navigator's view so that he appears to move forward and backward. The farther the navigator moves the mouse away from the cross hairs, the greater the navigator's perceived velocity. In an alternative embodiment the navigator can also turn relative to the scene that he is viewing.

In a preferred embodiment, holding the shift button down while engaging the middle mouse button and moving the mouse forward also changes the navigator's perceived position downward. The navigator's perceived position moves upward if the shift button and middle mouse button are engaged while moving the mouse backward.

Display Modes

The main interaction and display panel may be presented in several different ways or modes. By default, in this example of the preferred embodiment, the interaction and display panel initially displays a complete information landscape representing a data base system hierarchy. This initial mode is referred to as the landscape mode. Alternatively, information may be displayed in the split-screen or multi-screen mode, in which two or more interaction and display panels are displayed simultaneously, each in a different display mode if desired. In each display screen, a cursor appears in the overview display to represent the navigator's position in each active display screen. The navigator moves around in the currently selected screen.

Referring now to FIG. 2B, a user may select the warp mode navigation by double clicking on a particular cell. In warp mode navigation and viewing, a single cell is displayed. Child cells are shown as icons 290 or hypedinks to these children below the warped directory. Clicking the left mouse button on one of these child icon hyperlinks 290 "warps" the navigator's view to display the selected cell at close range as shown in FIG. 2B. Three special buttons are displayed above the warp directory. The ". ." button 285, if selected, warps the navigator's view to the parent directory. The "<-" and "->" buttons 280, if selected, warp the navigator's view to the siblings of the selected cell. The warp mode enables the user to interact with displayed data blocks. The user may separate the data blocks by type, sort them or change their layout within the warp mode display. A user exits the warp mode by clicking outside of the boundary of the selected cell that is presently being viewed in warp mode.

Double clicking on a text type data block causes the system to present the data block to the user in a viewer panel. The viewer panel may provide limited editing capabilities to the user. A full editor is available by pressing the edit button from within the viewer. Changes may be saved by pressing the save button, and the editing session may be terminated by pressing the done button. A full editor is available by default upon setting a *useViewer resource in the operating system to FALSE.

The Overview Window

A preferred overview window is shown in FIG. 3. The Overview 300 window shows a 2D overview of the entire cell topology. The overview window can be hidden via a selection within the Show menu. The navigator's position within the 3D landscape is indicated by a visible cursor "X" 310 within the 2D overview window. If the split screen or multi screen mode are enabled, each screen position is shown in the overview window utilizing different colored X cursors corresponding to the different active screens.

Clicking the left mouse button on a cell displayed in the overview window selects the cell and zooms the navigator's view to it. In the warp mode, the navigator's view moves directly to a selected cell. Clicking the left mouse button on a different location zooms the navigator's view to that location. This command has no effect in the warp mode.

The shift-left mouse selects a cell without zooming to it. This command has no effect in warp mode. Clicking the middle mouse button while the cursor is in the overview window zooms the navigator to the location indicated (except in warp mode) without selecting the cell. The cursor does not track the mouse's movement directly, but deliberately lags behind it, moving at a constant rate of speed to provide for smoother perceived motion on the display screen.

The Session Menu

The Session menu provides for parameter selection and commands that affect the system parameters. The session commands comprise the following:

Split Screen—Splits the screen in two.

Rescan—Rescans the entire file system. Normally, a directory is rescanned any time rescan is selected. Also, monitored directories are continually updated. FSN is usable during a rescan, but may be slower due to the increased demand on system resources caused by the active rescan. An occasional rescan is preferable to keep the state of the display current and in synch with the state of the underlying database.

Save Database—Saves the file system database. Preferably the database is automatically saved every 15 minutes, and also saved when terminating use of the present invention. However, if extensive changes have been implemented in the underlying data, it is preferable to save the database immediately in case of inadvertent termination prior to the operator casually saving the changes or before an automatic save occurs.

Process Deletes—Items previously selected for deletion from the File menu are actually deleted by selecting this command. This action is irreversible.

Undo Deletes—Items previously selected for deletion from the File menu are canceled if Undo is selected and executed before selected deletes are processed by a Process Deletes command.

Quit—Saves the database and Quits.

The Show Menu

The Show menu enables the user to display or hide the various auxiliary windows. If a window is showing or hidden when exiting FSN, it will be showing or hidden during a subsequent FSN session. Any window may be hidden by selecting "Hide" within the show menu and selecting a window from there.

Overview—Brings up the overview window, discussed above.

Controls—Shows the Control panel, discussed below.

Legend—Shows a legend at the bottom of the display screen listing the files' ages.

Preference panel—A panel that enables the user to reconfigure various system resources such as color or the x-compression coefficient.

The Display Menu

The display menu controls display of files and directories. Changes made via this menu are remembered for subsequent invocations of FSN. The display menu has two submenus: Height and Directory Height.

The Height submenu affects both files(data blocks) and directories(cells) as follows:

None—When selected the FSN does not display height. Note that all files are still displayed but at a minimum height.

Linear—The height is proportional to the size of the file or directory. All files are represented with a minimum height.

Exaggerated—The height is proportional to the square root of the size of a represented file or directory. This technique enlarges small data blocks and cells more than larger ones, and tends to avoid disproportionate directories containing numerous small data blocks or cells and one or two extraordinarily large data blocks or cells.

The Directory Height submenu controls how the height of a directory (cells represented as pedestals) is determined. The Directory Height submenu commands are:

Flat—Draws all cell representations (pedestals) flat.

Files Only—The pedestal or cell representation size is based on the size of the data blocks or files within the cell or directory. Subdirectories are not considered in calculating the cell size.

Including Children—The size of the directory representation is based on the size of the files within the directory, plus the size of the files within all subdirectories.

The Directory Menu

The directory menu contains commands that apply to the selected directory. If no directory is selected, the directory menu is disabled. The directory menu commands are:

Monitor—turns on and off permanent FAM for the selected directory which is monitored only while it is selected.

Monitor Subtree—Turns on permanent FAM™ for the selected directory and all of its children.

Stop Monitor Subtree—Turns off permanent FAM™ monitoring for the selected directory and all its children.

Rescan Subtree—Similar to Rescan on the session menu, except this function only rescans for changes in this directory and all its children.

Prune—Removes all children from the selected directory.

The File Menu

The file menu contains commands that apply to the selected file. If no file is selected, the file menu is disabled. For convenience, the File menu also appears as a popup menu.

When using the popup menu, be aware that the file commands apply to the selected file, not the file that is under the cursor and is highlighted.

Open—Equivalent to double clicking on the file, this edits, executes, or performs any other appropriate launch action on the file.

Print—Prints the file.

Delete—Marks the file for delete. The file changes to a wire frame. You must choose Process Deletes from the Session menu to actually delete the file. Selecting this item again will unmark the file for delete.

Move file, Copy file, and Link file—To use these items, you must be in split screen mode. In one screen the user selects a directory (only), and in the other a file. The file will be moved (copied, linked) to the directory.

The Control Panel

The Control window as shown in the left and upper perimeter of FIG. 1 comprises various controls that can be utilized as navigational aids. The control panel commands are:

Reset—Sets view back to the initial viewing position above the file system.

Go back—Returns to the position previously occupied by the Navigator just prior to the most recent move or zoom. Repeatedly pressing Go back takes additional steps back.

Birds eye—Presents a view from above the file system to the navigator. In landscape mode the view is high above the landscape; in warp mode the view is from just above the warped directory.

Front view—Presents the front view as seen by the navigator. In the landscape mode it is identical to reset, in warp mode it takes the navigator's view to the front of the warped directory.

Tilt and Height—Controls the navigator's viewing angle relative to his perceived height above the ground plane.

These commands also affect the perceived position and view presented to the navigator.

Marks

The Mark control enables a user to mark a position and automatically return to the marked position later. In a preferred embodiment cells, data blocks, and positions may be marked. The navigator simply presses the mark button 135 as shown in FIG. 1 to mark his current position. The present invention displays a dialog box 136 to enable the navigator to choose a name for the mark. The default mark name is the file or the directory name selected. The navigator can change the default mark name or choose a new mark name as desired.

The navigator selects the mark in the Marks menu and presses the "go to" button 137 to return to a marked item. The navigator can also double click on the menu entry. The user may delete a mark by selecting the mark in the mark menu and pressing delete 138. Marks are stored and remembered so that the marks are accessible in later invocations of FSN.

Color Resources

In the illustrated embodiment, all resources can be changed via the preference panel with the exception of the landscape resource. Landscape (default: grass)—Landscape is a meta-resource that controls the default values of other resources. Values currently available are grass (a scene of a meadow during the day), ocean (an ocean scene at sunset), desert (a desert scene at sunrise), space (black background), and indigo (a scene similar to grass, but with the colors optimized for double buffered mode on an Silicon Graphics, Inc. Indigo workstation).

useGouraud—A boolean variable that controls whether the sky and ground are drawn with Gouraud shading or flat shading.

groundColor—The color of the ground if useGouraud is FALSE.

farGroundColor and nearGroundColor (default: vary by landscape) The color of the ground if useGouraud is TRUE.

skyColor—The color of the sky if useGouraud is FALSE.

topSkyColor and bottomSkyColor—The color of the sky if useGouraud is TRUE.

overviewBackgroundColor (default: same as groundColor)—The background of the overview window.

dirColor—The color of an unselected cell. Selected cells are a brighter version of this color.

warpDirColor—The color of cell buttons in warp mode.

specialDirColor—The color of the special cells (<-, . . . , and ->) in warp mode.

dirMonColor—The color of the skirt surrounding permanently monitored cells.

selLineColor—The color of a connector line leading to a selected cell.

unselLineColor—The color of a line leading to an unselected cell.

pruneColor—The color of a line leading to a pruned cell.

spotlightColor—The color of the spotlight highlighting files.

warpFlashColor—If flashOnWarp is TRUE, the color of the flash.

fileColor0 through fileColor6—The colors representing the ages of data blocks.

The following resources are floating point values that determine how a base color is modified when drawing data blocks and cells.

colorSelectSaturationFactor and colorSelectValueFactor—The saturation and value of the base color are multiplied by these factors if the cell and data block are selected.

colorUnselectSaturationFactor and ColorUnselectValueFactor—The saturation and value of a base color are multiplied by these factors if the cell and data block are unselected.

colorTopValueFactor, colorSideValueFactor and colorBackValueFactor—The values of the base colors are multiplied by these factors to achieve the artificial lighting.

colorShadowSaturationFactor and colorShadowValueFactor—The saturation and value of the base color are multiplied by these factors to achieve the color of the icon shadow.

Control Resources

Control resources provide control over the behavior of the FSN in the preferred embodiment.

shrinkOnZoom (default: TRUE)—If TRUE, zooming to a data block shrinks the full block size file to a smaller height and leaves a slender pole the same height as the full size data block. Shrinking prevents occlusion of smaller blocks and makes it easier to see files located behind the shrunken block. If FALSE, full sized blocks are retained.

beamOnMove (default: TRUE)—If TRUE, a beaming effect is utilized when moving, copying or linking data blocks. This can be turned off by setting this resource to FALSE.

useViewer (default: TRUE)—If TRUE, opening a data block uses a built in quick viewer, rather than an editor.

propagateMonitor (default: FALSE)—If TRUE, new data blocks created in a permanently monitored cell are also permanently monitored.

compressDatabase (default: TRUE)—If TRUE, the FSN utilizes compress to save the database on disk.

flashOnWarp (default: FALSE)—If TRUE, generates a flash whenever warping.

spaceballTilt (default: FALSE)—If TRUE, the spaceball controls the tilt angle as well as x, y, and z navigator position coordinates.

monitorTimeout (default: 120)—Time period selection for directories that are not permanently monitored with FAM™, monitoring is started whenever a cell is selected. After a cell is unselected, monitoring is ceased this many seconds after the unselection. If the directory is reselected before this timeout, FAM™ continues.

locateHighlightThickness (default 3)—The thickness in pixels of the locate highlight information.

mouseSpeed (default 0.7)—Controls the sensitivity of the mouse when navigating. Increasing this value will cause the navigator to move faster for a given mouse displacement. The units are arbitrary.

heightPower (default 0.5)—In exaggerated mode, controls the power used for exaggeration. 0.5 uses the square root. 0.33 uses the cube root. 1.0 is the same as linear. 0.0 makes all files the same size (large).

maxFileHeight (default 4)—Controls the height of the tallest file. Units are arbitrary.

maxDirHeight (default 2)—Controls the height of the tallest directory. Units are the same as for files.

shrinkagePower and shrinkageDistance—In order to see a larger context, objects in the distance are narrowed much more than normal perspective. These two resources control this narrowing. Objects at a distance of shrinkageDistance are narrowed by a factor of shrinkagePower. For example if shrinkagePower is 2.0 an object twice as far away, is half as wide (in addition to the effects of normal perspective). To obtain a normal perspective, the shrinkagePower is set to 1.0. In a preferred embodiment, shrinkage power is set to 1.9.

Layout

In the preferred embodiment, the cell hierarchy is laid out in a tree structure, however, other layouts can be utilized. The tree layout prevents overlapping cells. Cells within the tree may be of different sizes, depending on how many data blocks are represented in the tree structure. The size of the data block name also affects the amount of space is allocated to the cell.

Lines connect the cells in the tree. The connector lines to descendent cells emerge from the sides of parent cells. Connector lines from a parentconnect to the front face of the descendent cells. The names of the cells annotate the lines, and are rotated as the lines are rotated.

Data blocks are laid out as an array on each cell pedestal. The layout of the tree structure and the layout of individual cells may change when a data block or cell is created or deleted. The user may also prune the tree which changes the layout.

The height of each data block is based on the height value selected in the Display menu. However there are different algorithms available for calculating height. Height can be changed programmatically or in accordance with a change in the data which it represents.

Artificial perspective

Turning now to FIG. 5B, a presently preferred display format is shown for navigation. FIGS. 5A shows the displayed objects in normal perspective format. FIG. 5B shows the same set of displayed objects with an altered or shrunken perspective. In the illustrated example, displayed objects are shrunken in the "X" or horizontal dimension to enable more visible objects to appear on the display simultaneously together. Shrinking enables the navigator to view the displayed objects in the context of their neighborhood of surrounding objects, thus providing a greater context to the navigator as he or she views an object. The navigator may view the entire topology of objects simultaneously together in the display space utilizing the altered perspective technique. In an alternative embodiment, the vertical dimension of the data objects may be compressed as well.

In the preferred embodiment, where the observer is not permitted to turn, the perspective can be calculated statically. The X axis of every displayed object is narrowed in this static layout based on its Y distance from the base point. When rendering the scene, the X axis of the whole figure is expanded based on the viewpoint of the observer, in an amount exactly compensating the shrinkage of an object at that point. The effect of this is that a given object will appear the same size at a given distance from the observer, regardless of the observer's position in the layout. In an alternative embodiment, when the vertical or Y dimension of the displayed data objects may be compressed as well, the compressed y dimension, the Y axis of the whole figure is expanded based on the viewpoint of the observer, in an amount exactly compensating the shrinkage of an object at that point.

Artificial perspective also affects navigation. When navigating in the X dimension, speed is adjusted based on the shrinkage at the observer's location. When zooming towards a destination, a straight line would not keep the destination in the observer's view, as the points along a line between a viewed object and navigator's artificial perspective do not lie in a straight line. Actually, due to the compressed X dimension, a curved line exists between the navigator and the object he is viewing in artificial perspective. Thus, the navigator's actual path when traveling toward the object is curved. To compute the path to a given point that holds that point of view, the x and y distance to the point are calculated, with the x distance including the shrinkage factor of the current y position. Then, the y distance is divided by the number of steps. For each step, the new is calculated so that the ratio of the x distance over the y distance at the new point being the same as the ratio at the original point, with the x distance at the new point being multiplied by the shrinkage factor for that point's y. This calculation cancels out the effects of the artificial perspective so that the operator perceives travel in a straight line toward a destination in the compressed space of artificial perspective.

In an alternate embodiment, the navigator is permitted to turn relative to the scene. In such an embodiment, the layout would be recalculated at the new angle. In an alternative embodiment where the Y component of a display object is compressed, this Y component would be recalculated as well.

In order to view a representation without the elongated aspect ratio of a hierarchical tree structure, the preferred embodiment provides for an artificial perspective wherein items in the distance are narrowed much more than normal perspective would dictate. In addition to normal perspective, items in the distance are shrunken as a factor of the distance $X^n$. The preferred factor is a reduction on the order of $X^{1.9}$, however, the shrinkage exponent n is user selectable. The layout of the display is computed statically taking this reduction ratio into account.

The shrinkage factor is adaptively adjusted so that for initial presentation of the data base, all significant objects relative to the data base, or underlying data, are visible at once on the screen. In a preferred embodiment the shrinkage factor may be adjusted from the preference panel to achieve optimum information density. In an alternative embodiment, the shrinkage factor is automatically adapted to present the initial display representation of the data base view at an optimal information density. The optimal information density is achieved by presenting the optimal presentation of information on the screen.

The optimal information density depends on how may objects are presented together on the screen, and varies according to the kind of data represented and the way in which it is presented. It varies, for example, as a function of how many row and columns are presented, how many levels are presented, and how the tree or underlying data is structured. If the information density is too high, the display overloads the ability of the human observer to perceive and comprehend the data. If the information density is too low, the human cognitive capacity is under utilized and reduces context available to the user. Thus it is important to enable the user to adjust the shrinkage factor, and thus the information density of the display.

Performance features

Cells which are not visible are culled. Culled, distant and very small directories are not drawn. Cells can either be drawn as a 3D box or as a 2D plane depending on their height and their perceived distance from the navigator.

Data blocks can be drawn or represented in several ways, in accordance with their perceived distance from the navigator: (1) When close to the navigator, data blocks are drawn as a 3D box. (2) At a medium distance data blocks are represented as a 2D plane. (3) At a greater perceived distance from the navigator the data blocks are represented as a vertical line. (4) When data blocks are perceived at an even greater distance, short data blocks which are of the same color as the majority of the surrounding data blocks, are not drawn, instead, the surface of the pedestal is colored to match the color of the majority of the data blocks. Text or icon labeling of data blocks and cells is displayed only when the navigator is very close to the viewed object, as in (1) above. The invisible faces of data blocks and cells are not drawn.

In an alternative embodiment, some or all of the lines linking the cells are not drawn. Line exclusion is performed both by not drawing certain lines which are not visible, and collapsing lines that are close together into a single line.

Shading

In a preferred embodiment, a light model is utilized to give data blocks and cells appearing in the information landscape a 3D appearance. Icon colors are also a function of the base color shading. When a data block or cell is selected, it is lightened or shaded in a color similar to its base color in an alternate embodiment. The sky and ground are optionally Gouraud shaded and all other objects in display space are normally flat shaded. The sky remains at a fixed distance from the viewer. However, as the viewer moves back and forth along the landscape, the sky moves as well.

Locate highlight

When the mouse is located over an object the object changes color so that it is highlighted. This is referred to as locate highlight. Locate highlight is performed in the overlay planes. Highlighting is performed at the exact location of the object being highlighted. When a directory is highlighted, the line leading to it is highlighted as well. If a parent directory is blocking part of a line, in the display space that part of the line is not drawn.

The locate highlight of a file is drawn as a wire frame. Only the visible sides of a block are drawn. However, blocks in front of the file do not obscure it. The object is also highlighted as it appears in the overview window. Locate-highlight is turned on and off respectively when entering and leaving the window.

A cell or data block is highlighted under the following conditions: (1) When the pointer is over a data block or cell, or a line leading to a data block or cell; (2) When the pointer is over a cell in the overview window; and (3) When the pointer is over a text item containing the file name and the data block name is spelled there (or partially spelled). In an alternative embodiment, display items are redrawn quickly so that highlighting does not utilize the overlay planes, and enhanced highlighting is possible.

A mouse button is utilized used for navigation. When the user presses the mouse button the FSN presents a set of cross hairs in the overlay planes. The cross hairs are of a fixed size regardless of the window aspect ratio. Moving the mouse away from the cross hairs position sets up and presents to the navigator a perceived velocity proportional to the distance that the mouse is moved from the cross hairs.

The calculation of the perceived speed in the X direction takes into account the X compression of the artificial perspective. The perceived distance moved is affected by the speed of drawing, so that the perceived velocity is the same regardless of the time it takes to draw the scene. In a preferred embodiment the navigator cannot navigate beyond the edges of the hierarchical representation, or below the ground plane level. In an alternative embodiment, where the Y dimension is compressed, the calculation of the perceived speed in the Y direction takes into account the Y compression of the artificial perspective.

Height Reduction to Avoid Occlusion

Figure 4C:
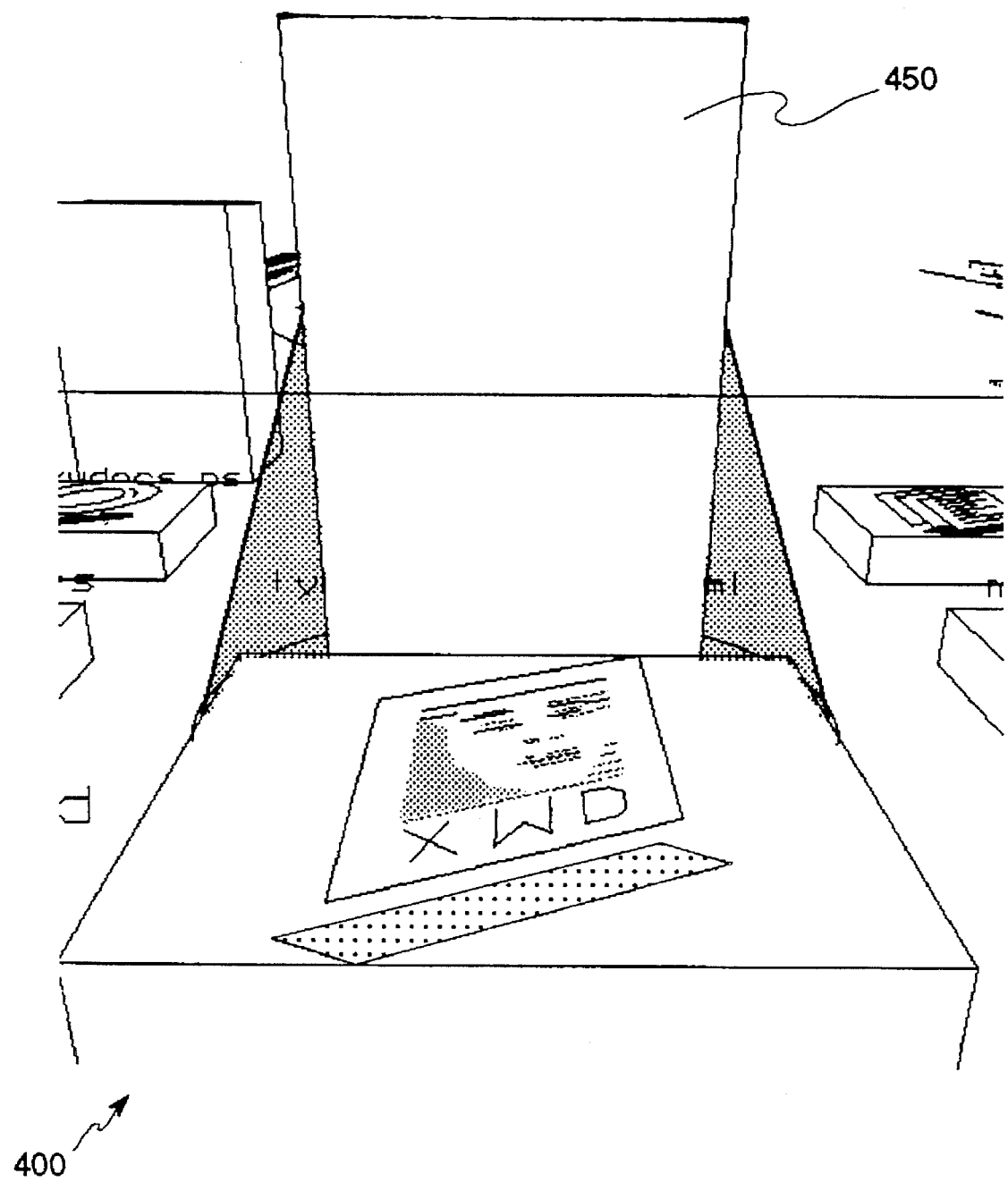
FIG. 4C illustrates an occlusion.

Referring now to FIG. 4B, It is possible to zoom into a cell 400. Each cell has a spot to which the zoom may occur. While zooming into a cell 400, all data blocks in the cell are reduced to a short pedestal with a slender column 440. The height of the column represents height of the data block 450 before reduction. This reduced data block representation enables the navigator to see the data blocks 460 located behind the zoomed data block 450. These files might otherwise be occluded by the zoomed file as illustrated in FIG. 4C.

Positions Saved

It is possible to save a position. A position is not just a set of xyz coordinate, but also includes a position relative to the selected cell or data block. Thus if the layout of the hierarchy is changed, the navigator's view will appear again as saved so that he appears to be in the same position during a subsequent invocation of the present invention. Two positions can be compared for equality, to avoid saving the same position twice. The navigator's position is saved before and restored after the hierarchy is relaid out, so that his view does not appear to change, and before every move or zoom, so that he can go back to his previous position. Positions are also utilized for marks. When the navigator exits the FSN his position is saved to a file, and restored when he restarts FSN.

Spotlight selection

When a cell or data block is selected it is rendered in brighter colors or highlighted. Selected files also have a spotlight 430 beamed on them as shown in FIG. 4B. In a preferred embodiment, the spotlight emanates from a fixed point in space.

Text

Text drawing utilizes a 3D font. 3D text is subject to the same transformations as other the other objects in the 3D display space. Text on connector lines between directories is rotated to follow the line as it rotates to accommodate changes in the viewer's perspective. Text on the front of a file is tilted to stand up. If a file name is too long, the text is compressed to fit within the file's displayed representation.

Split screen

The display screen may be split into two screens, or in an alternative embodiment, into an arbitrary number of windows, which are detachable. One of the windows is selected. The selected window is referred to as the current window. Clicking in a window selects it. Navigation, both normal and overview, affects the selected window.

The two screens may display different views of the file system. The views may be built from the same database. However, the two windows can differ in the following manners: (1) Different sizes and aspect ratios; (2) Different locations causing: (2a) different artificial perspectives; (2b) different culled data blocks; different representations of data blocks and cells due to performance tuning effects; (3) Different selected data blocks or cells thus those data blocks are in different colors, and the spotlight is in a different position; (4) One or both windows can be zoomed into a data block causing data blocks in that cell to be displayed as short blocks with slender representative height column. (5) One or both windows may be in warp mode. Alternatively, the two screens are built from different data bases. In an alternative embodiment, more than two screens may be displayed.

Creating an Info Landscape for a Third Quarter Sales Report

Figure 8:
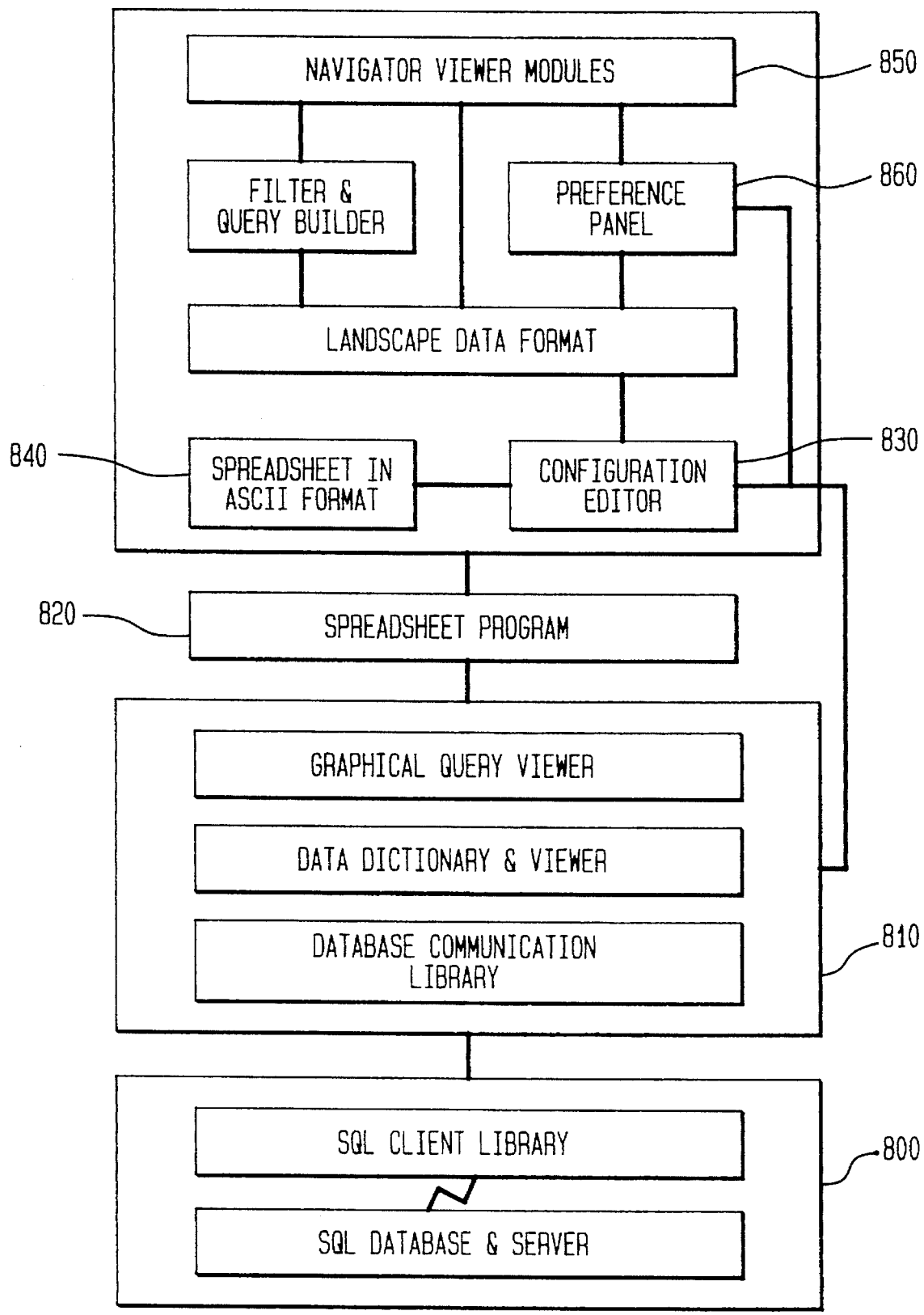
FIG. 8 is an illustration of an operational scenario in a preferred embodiment.

Turning now to FIG. 8, an example is presented wherein an information landscape is created for a third quarter sales report.

1) Utilizing an organization's available tools, a user establishes a connection with corporate database server 800 to obtain data. After browsing through the data dictionaries for the available tables, the user identifies the tables containing the data needed for a sales application and loads them into a graphical query tool 810.

2) With a graphical query tool, a user performs the necessary queries and operations to retrieve the required data components from the database and loads them into specified columns in spreadsheet application worksheet 820.

3) The intended application requires that the third quarter summary data for all the company's sales representatives be consolidated and summarized through all levels in the worldwide sales organization. The user brings up the Info Navigator Configuration Editor 830 and selects Cumulative Tree as the template type. In the configuration window the user enters the required information about the structure of the sales organization and how the data is to be displayed. For example, the user chooses bar charts as the display element and indicates that there will be 4 bars displayed in a row at each organization node.

4) In the meta-worksheet of the Configuration Editor, the user enters information about how to set up a Q3—Sales spreadsheet and what the data attributes and data types are in the various columns. The user also indicates the data types upon which the visual attributes height and color attributes will be mapped and which data will only be textually displayed.

5) In order to bring up the Info Navigator, the user loads in the spreadsheet file 840 and the configuration worksheet and launches the Navigator Viewer 850. Utilizing the Preference Panel 860, he adjusts visual and layout attributes. As the user navigates through the sales data, the Display Controls allow him to focus on different elements of his data.

Figure 9:
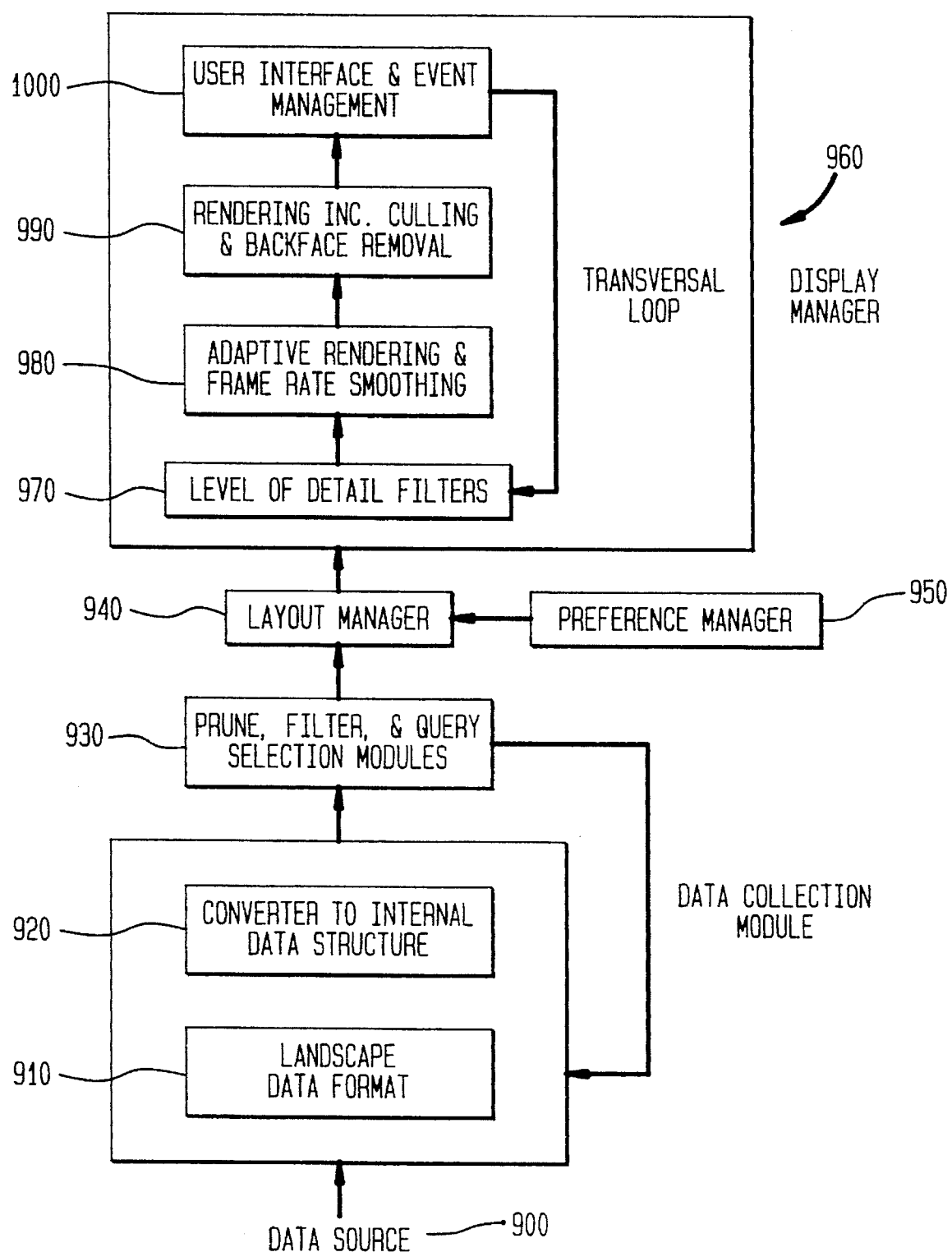
FIG. 9 is an illustration of processing flow in a preferred embodiment.

Turning now to FIG. 9, the processing flow in accordance with the preferred embodiment of the present invention is illustrated. A data source 900 supplies an underlying aggregation of data to be converted into landscape data format 910. The landscape data format is converted to an internal data structure 920. The user may then prune, filter and query the data 930.

The data is then passed through the layout manager 940 where the data is arranged for display. The layout manager utilizes the parameters provided by the preference panel via the Preference Manager 950 and the simulation language mapping of the data to display objects.

The display manager 960 handles the adaptive view to reflect a navigator's movement. Display manager adjusts the level of detail 970 in accordance with the navigator distance from a viewed object. Display manager also handles adaptive rendering and frame rate smoothing 980; Rendering Culling and Backface removal 990; and user interface and event management 1000. A parameter selection panel for the sales database is illustrated in FIG. 10A.

FIG. 10B illustrates a tabular representation of displayed data as sorted by type and attribute. FIG. 11 illustrates a tabular representation of data values represented in display space. FIG. 12 is a sample of the simulation language, written in C which is utilized to map data and data relationships into informational objects and topology displayed in a 3D graphical display space.

Preferred Template Structure Types

To enable users to easily transform large volumes of tabular data into a visual presentation of information manifesting both structure and context, a set of templates is provided in the preferred embodiment for mapping data into common structural forms. These templates comprise sample spreadsheet formats, configuration worksheets, and navigational viewers tailored to each common paradigm. Additional templates are available by changes entered in the simulation language. The following structure types are provided:

1) Array: basic row column layout of data blocks upon a simple node. Smooth transitions across higher dimensions are supported. 2D and 3D presentations are supported.

2) Geographic I.S. Array: data blocks are laid out according to spatial coordinates such as latitude and longitude upon a surface with distinct regions and/or terrain features. Flat and raised surface terrains are supported, as well as surfaces mapped onto 3D objects, such as a globe.

3) Basic Tree: data blocks are arbitrarily distributed among nodes in a hierarchical tree. Alternative 2D layout styles are provided.

4) Consolidated Tree: a specific number of data blocks at the leaf node level are aggregated and consolidated into the nodes higher up in the tree structure.

5) Basic Network: data blocks are arbitrarily distributed among nodes in a network graph structure, with a distinct source and sink node. Limited 3D layout capability is provided to avoid overlapping branches in the same plane.

6) Consolidated Network: a specified number of data blocks at the source node are aggregated and consolidated in nodes throughout the network.

7) Basic Directed Graph: data blocks are distributed among nodes in a arbitrarily structured graph. A 3D layout is employed to avoid branch overlap.

In addition to these provided types, mechanisms for extending these types or adding new types are provided. For each new structure type added, a new spreadsheet format, configuration worksheet, and specialized navigation viewer are provided.

Products for graphically querying database servers and downloading the resulting information into spreadsheet products are currently available. Thus, a preferred embodiment provides two main types of tool sets, a set of data import and configuration tools, and a set of viewing and navigation tools. These sets may be further broken down into the following components:

Data Manipulation Tools

The function of these tools is to enable the user to take existing spreadsheets and to add structural and formatting information to them sufficient for transformation into an information landscape representation. The organizing component for these tools is the Configuration Editor, a spreadsheet like tool for entering configuration information and transforming the target spreadsheet into a structured landscape format suitable for viewing and navigation. In addition, for each structure type, the following components are provided: a specification of additional fields and data types that are present in the spreadsheet cells for representing the given structure, along with sort operations; and an associated template in the Configuration Editor for specifying data parameters and associated visual attributes. The Configuration Editor also supports the addition of new types of structures.

Data Display Tools

Data Display tools support viewing and manipulation of the information landscape data. The main component is the Navigator Viewer, which embodies navigation and interaction paradigms appropriate to the type of structure viewed. Mechanisms for monitoring and updating the data associated with user identified regions are included. An associated Preference Panel enables the user to customize available visual and layout parameters. A simple user interface is provided for building custom display control panels which encapsulate desired query and filter operations.

Figure 7:
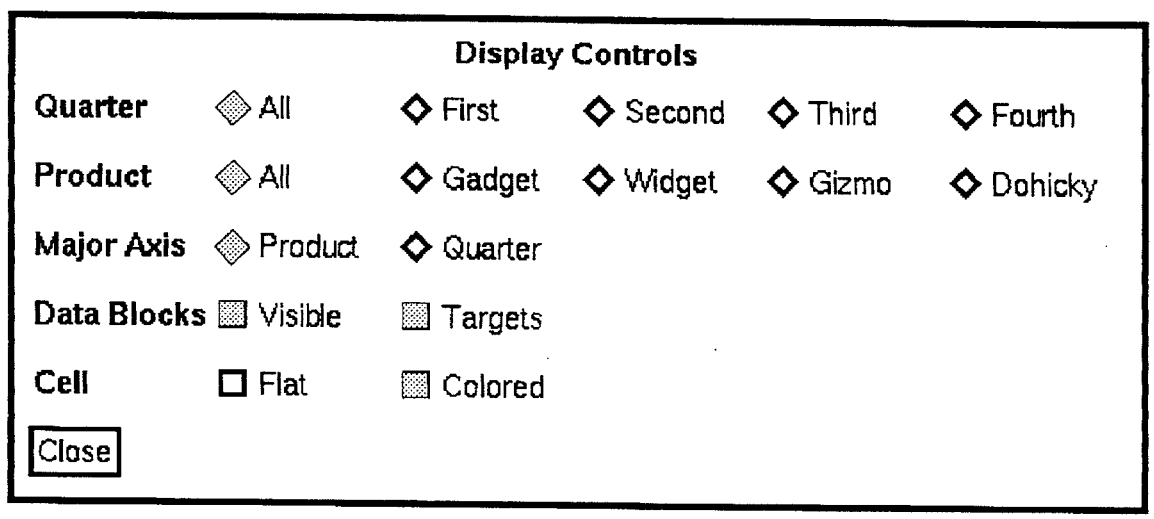
FIG. 7 is an illustration of the display controls menu of a preferred embodiment.

In a preferred embodiment the user may select more than one top cell in a hierarchy. In the preferred embodiment, the meanings of height and color are configurable as well as attribute thresholds and the number of colors. All data blocks have a minimum height even if they are of zero size. Within warp mode, data block size is relative only to data blocks in the viewed cell. As shown in FIG. 7, a query mechanism is provided (e.g. a user may query to determine sales data for a particular quarter (All, First, Second, Third, Fourth), or a particular product (Gadget, Widget, Gizmo, Doohickey), highlight representative objects in the main and overview windows, and visit them in order.)

Figure 14:
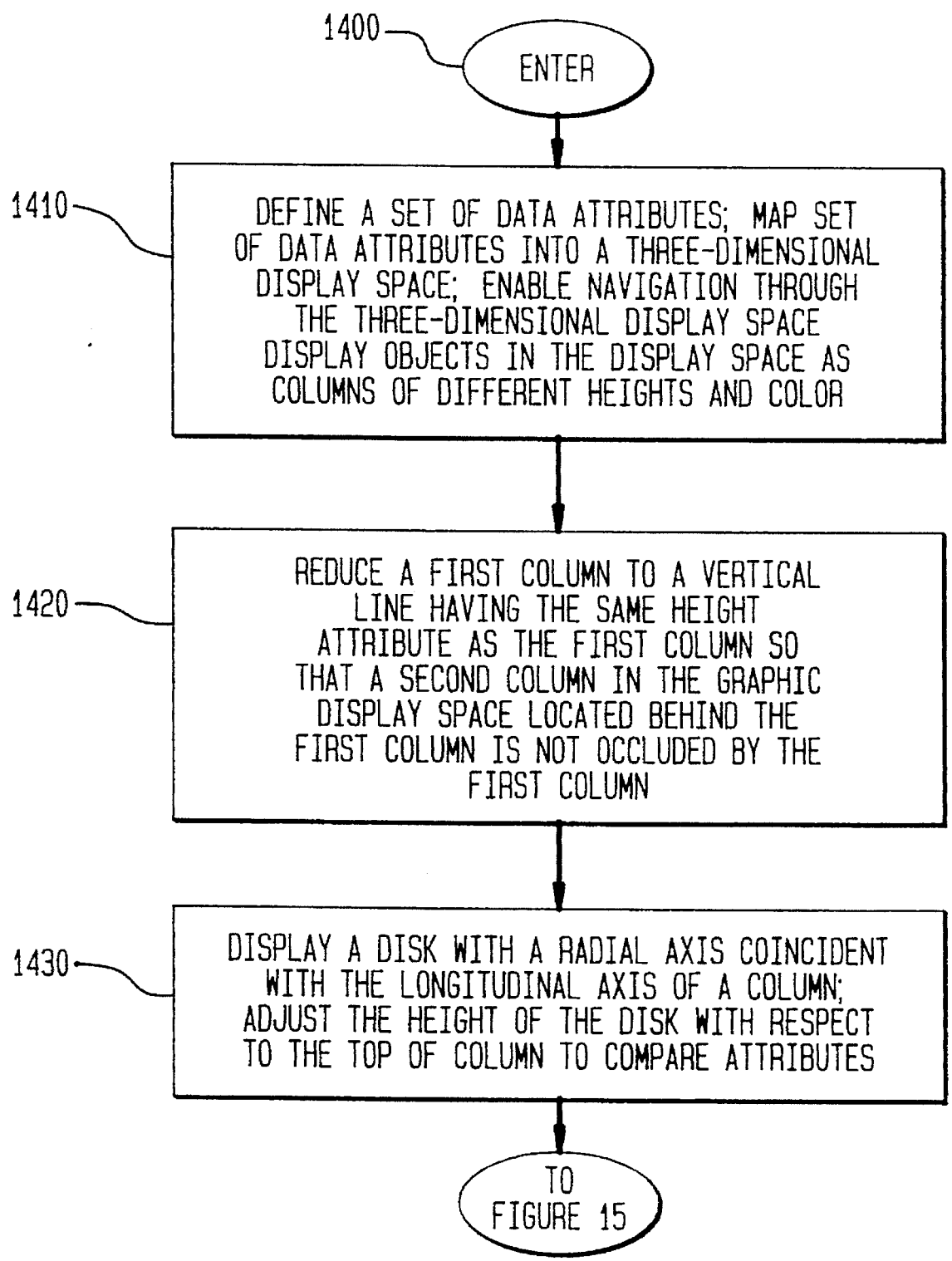
FIGS. 14–18 illustrate a preferred sequence of operations for a preferred embodiment.

Turning now to FIG. 14, a sequence of preferred operations for a preferred embodiment is illustrated. The present invention is invoked via entry point 1400. In block 1410 the present invention defines a set of data attributes; maps the set of data attributes into a three-dimensional display space; enables navigation through the three-dimensional display space and displays objects in the display space as columns of different heights. In block 1420 the present invention reduces a first column to a vertical line having the same height attribute as the first column so that a second column in the graphic display space located behind the first column is not occluded by the first column. In block 1430 the present invention displays a disk with a radial axis coincident with the longitudinal axis of a column; and adjusts the height of the disk with respect to the top of the column to indicate a comparison between attributes.

Figure 15:
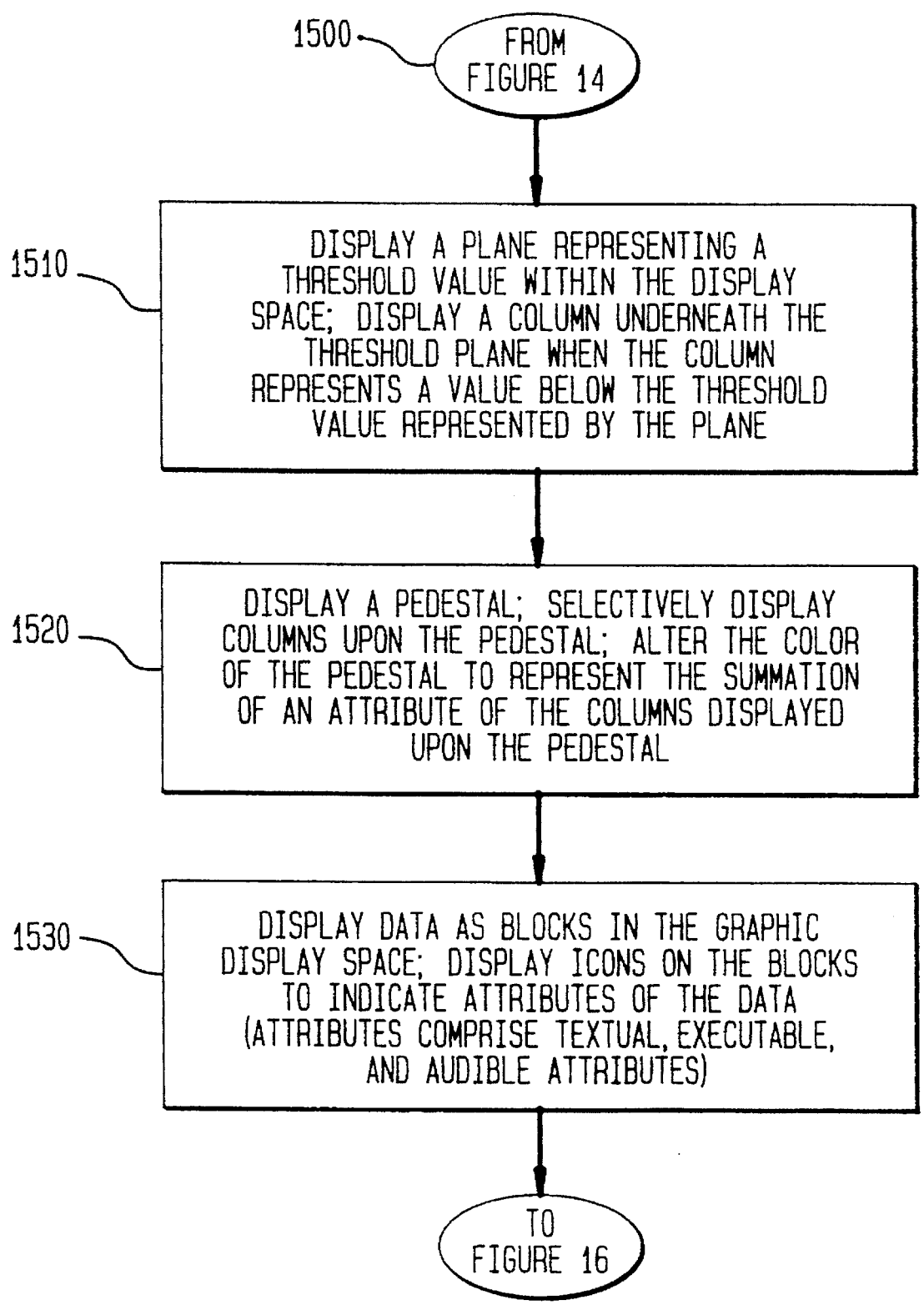

Turning now to FIG. 15, in block 1510 the present invention displays a plane representing a threshold value within the display space; and displays a column underneath the threshold plane when the column represents a value below the threshold value represented by the plane. In block 1520 the present invention displays a pedestal; selectively displays columns upon the pedestal; and alters the color of the pedestal to represent the summation of an attribute of the columns displayed upon the pedestal. In block 1530 the present invention displays data as blocks in the graphic display space; and displays icons on the blocks to indicate attributes of the data (attributes comprise textual, executable, and audible attributes).

Figure 16:
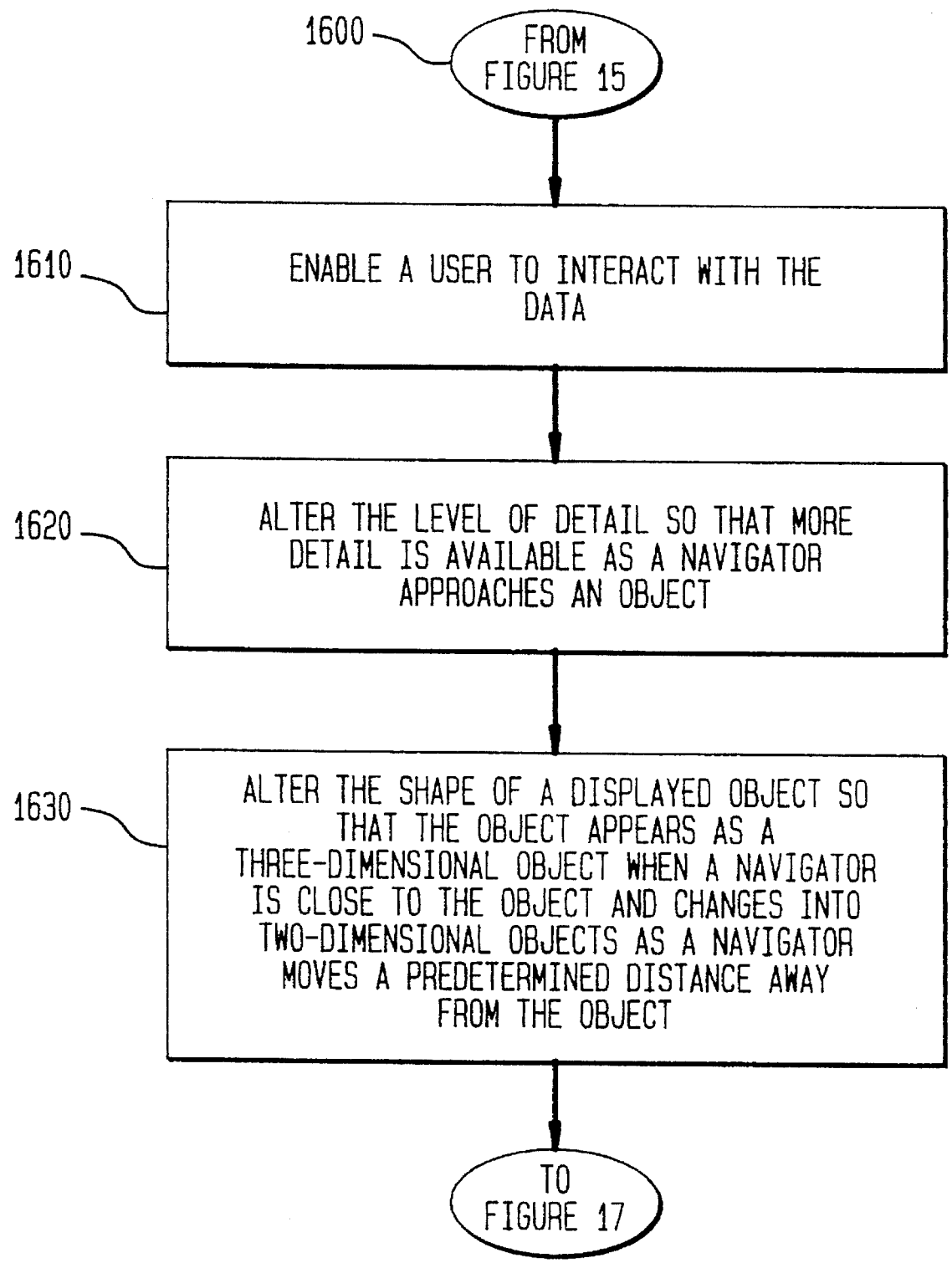

Turning now to FIG. 16, in block 1610 the present invention enables a user to interact with the data. In block 1620 the present invention alters the level of detail so that more detail is available as a navigator approaches an object. In block 1630 the present invention alters the shape of a displayed object so that the object appears as a three-dimensional object when a navigator is close to the object and changes into two-dimensional objects as a navigator moves a predetermined distance away from the object.

Figure 17:
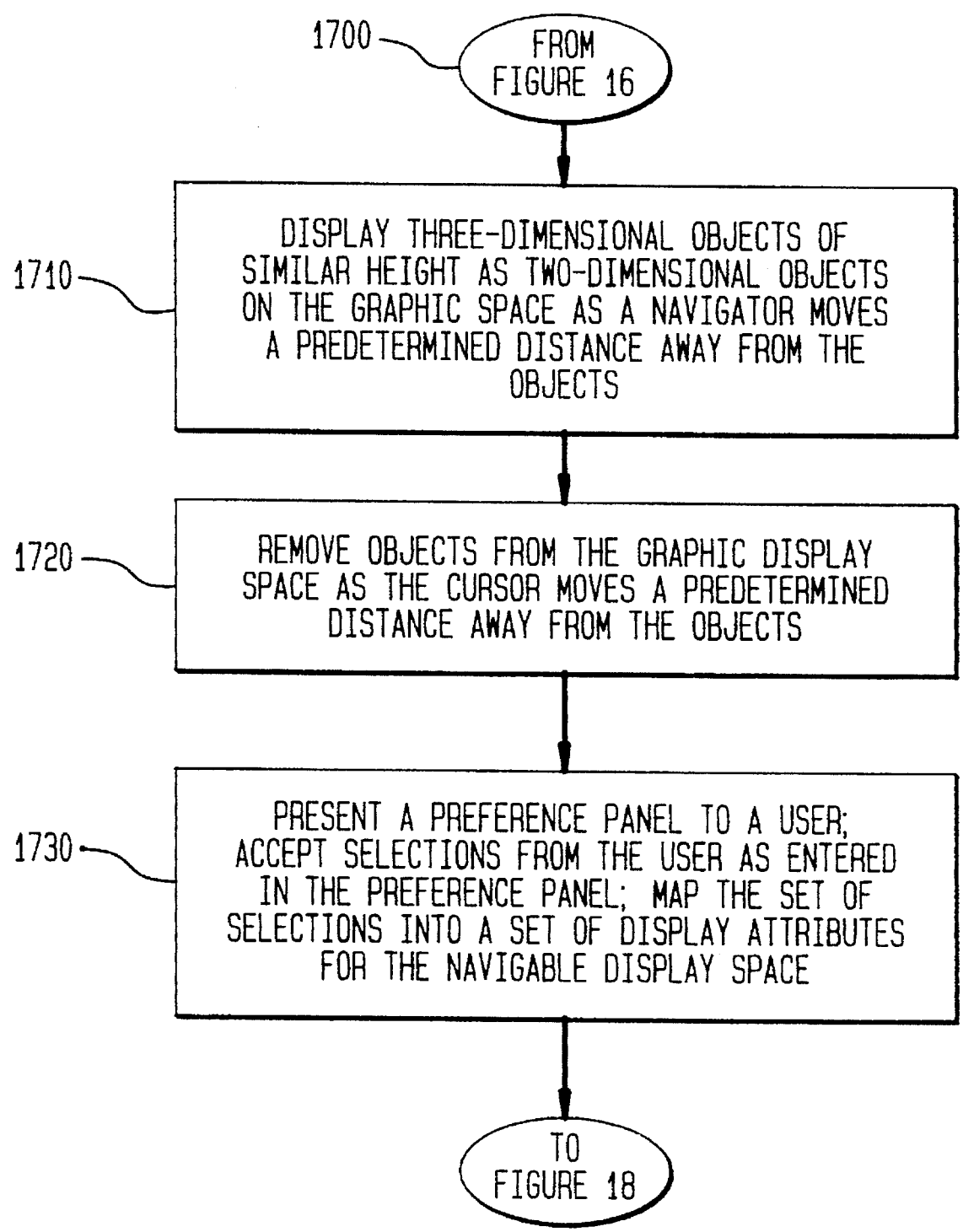

Turning now to FIG. 17, in block 1710, the present invention displays three-dimensional objects of similar height as two-dimensional objects on the graphic space as a navigator moves a predetermined distance away from the objects. In block 1720, the present invention removes objects from the graphic display space as the navigator moves a predetermined distance away from the objects. In block 1730, the present invention presents a preference panel to a user; accepts selections from the user as entered in the preference panel; and maps the set of selections into a set of display attributes for the navigable display space.

Figure 18:
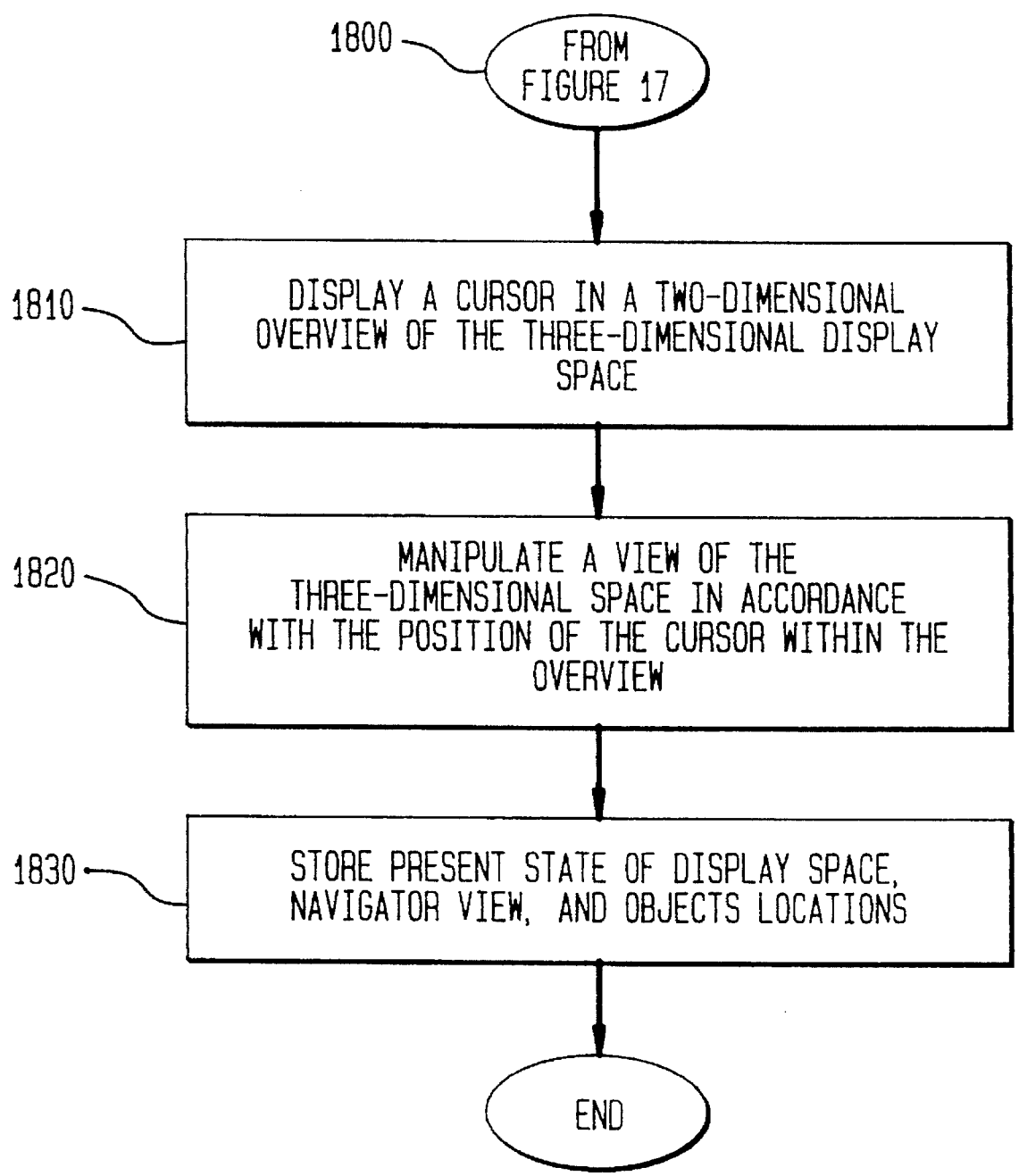
Figure 19:
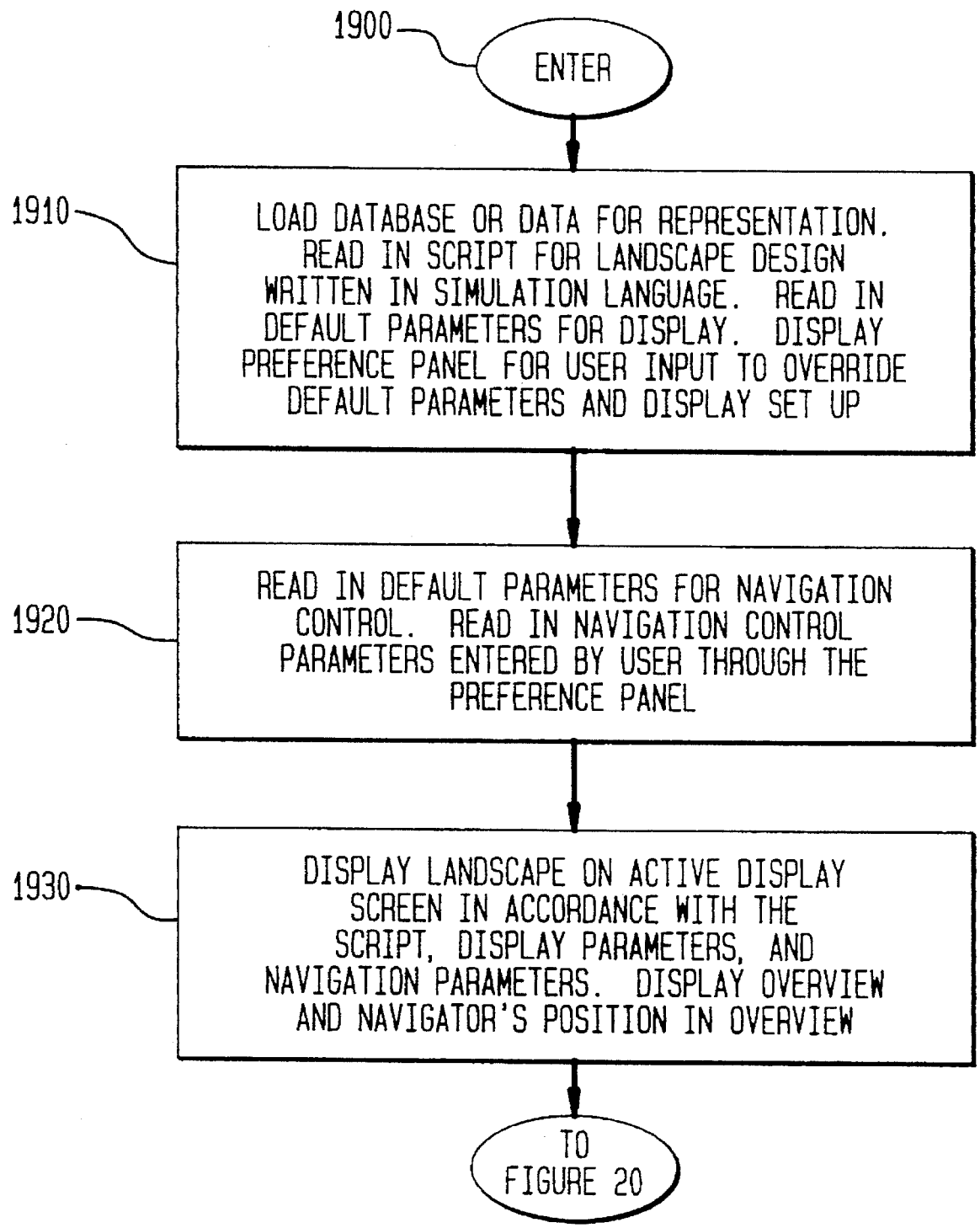
FIGS. 19–28 illustrate a preferred sequence of operations for another preferred embodiment.
Figure 20:
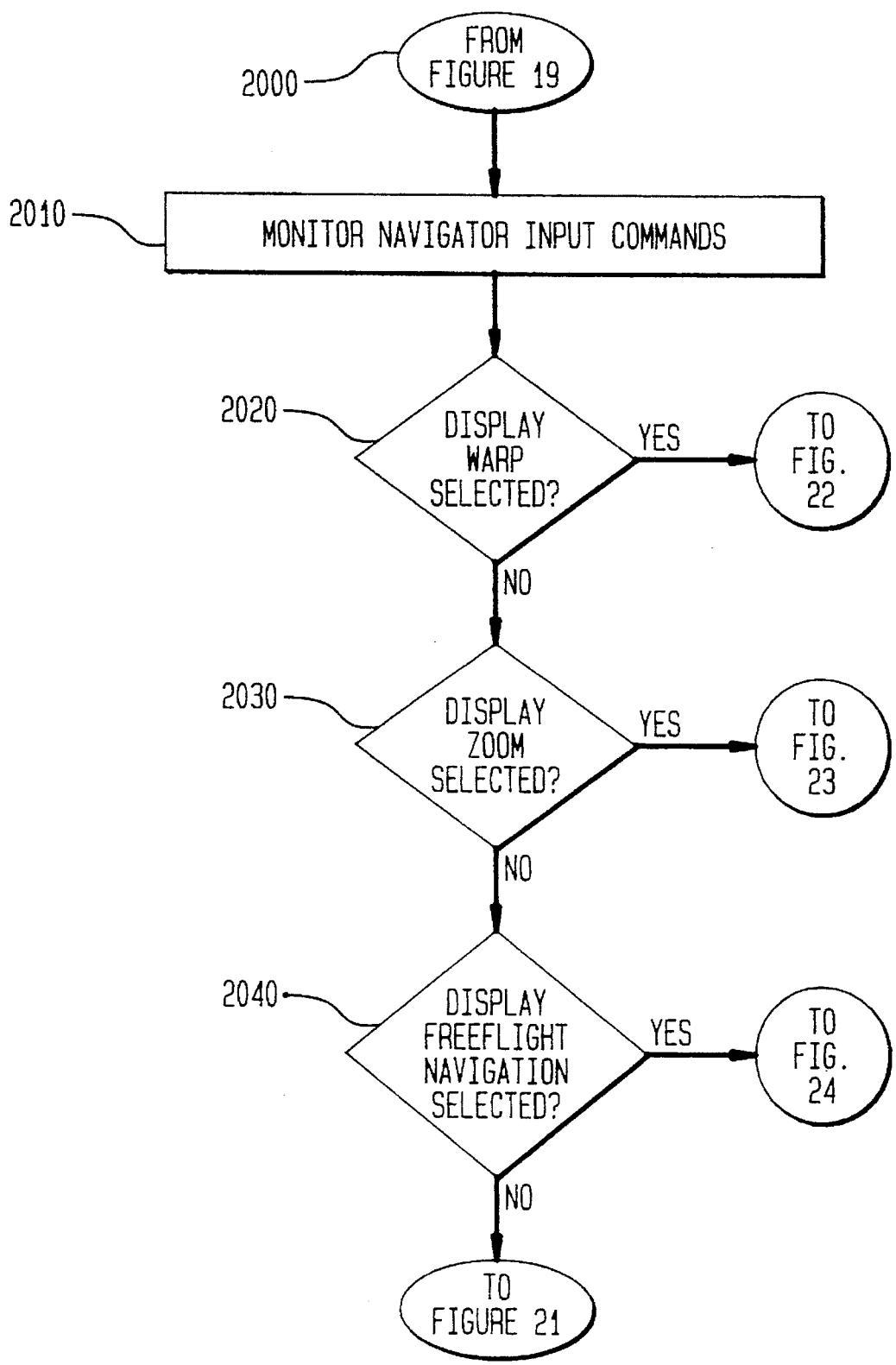
Figure 21:
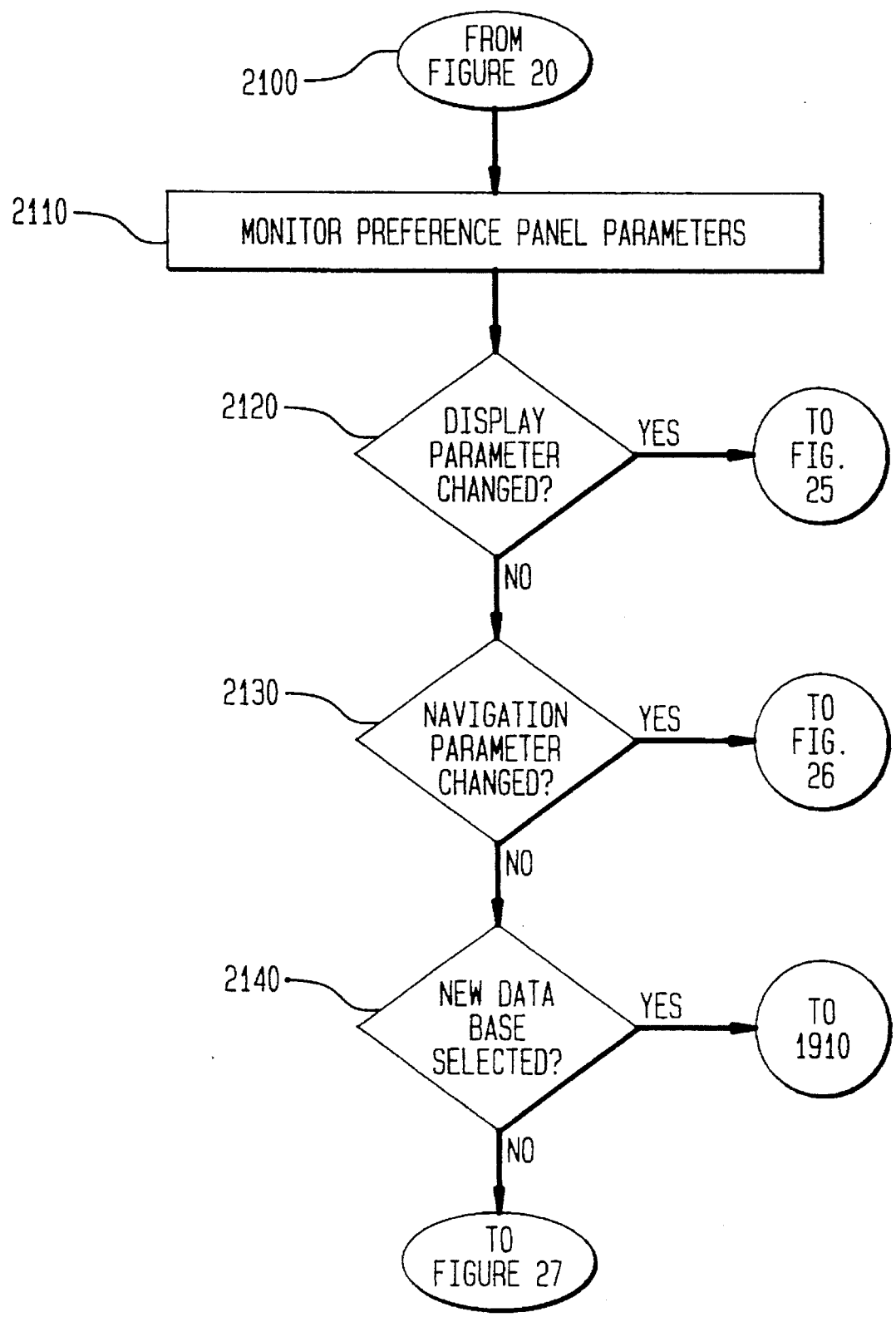
Figure 22:
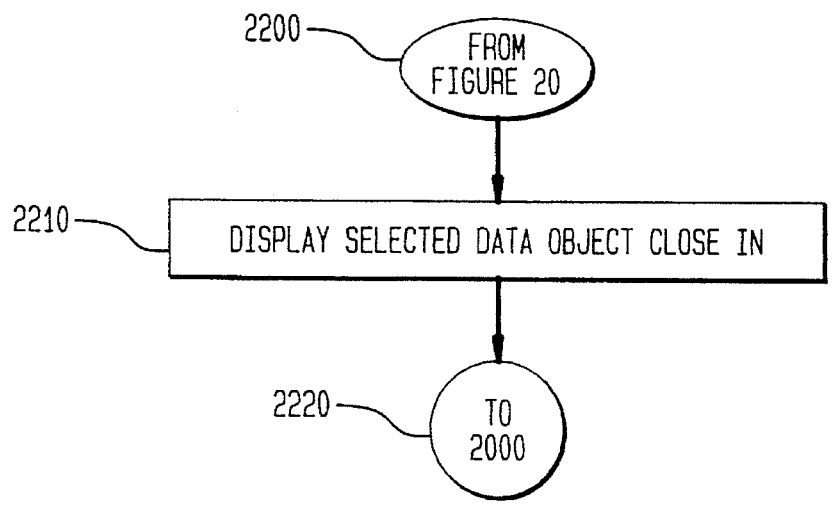
Figure 23:
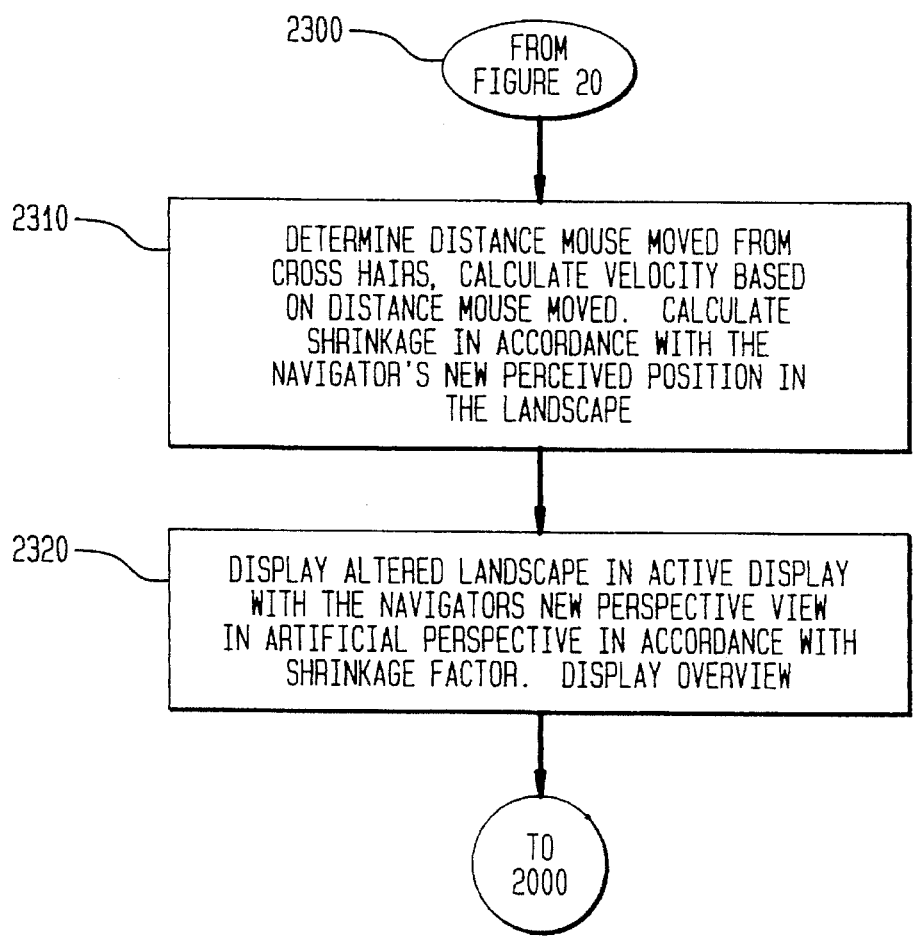
Figure 24:
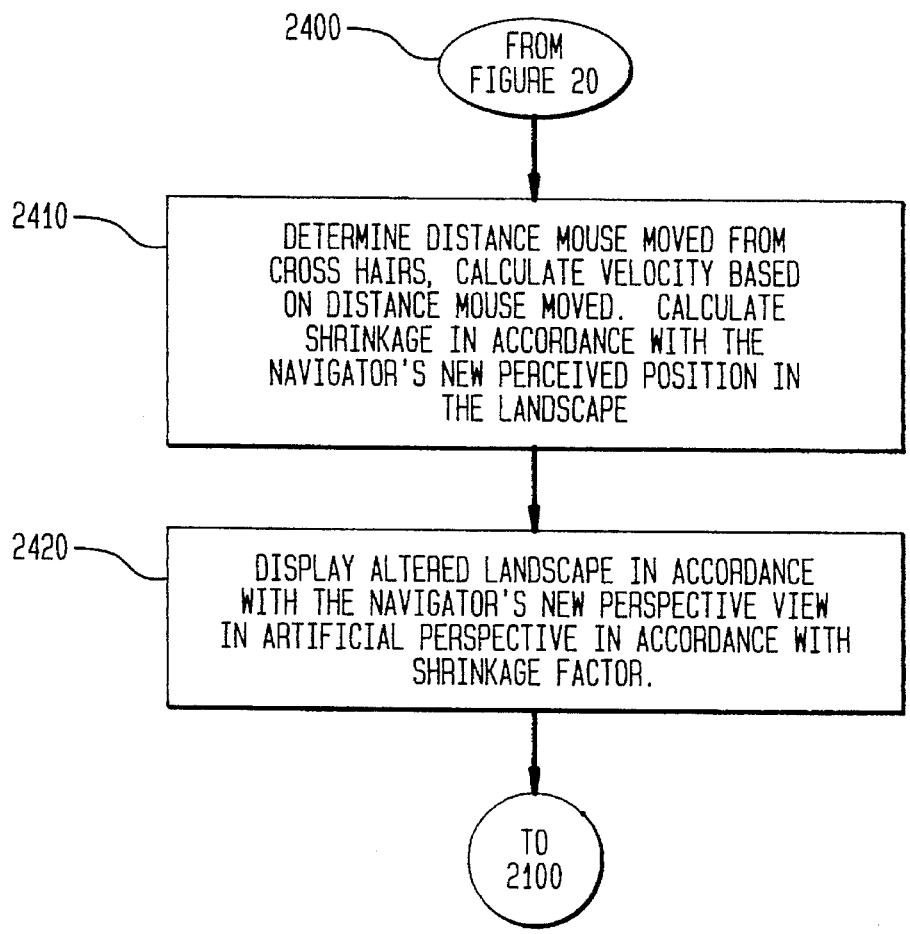
Figure 25:
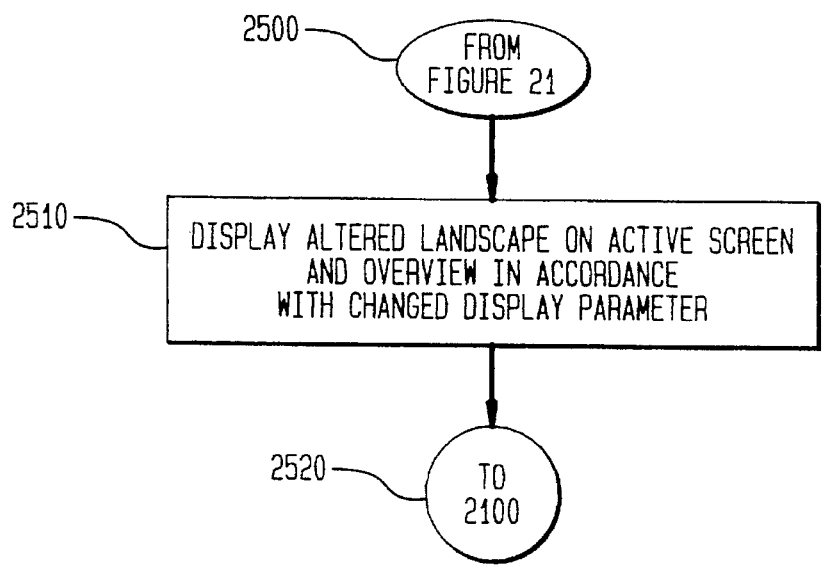
Figure 26:
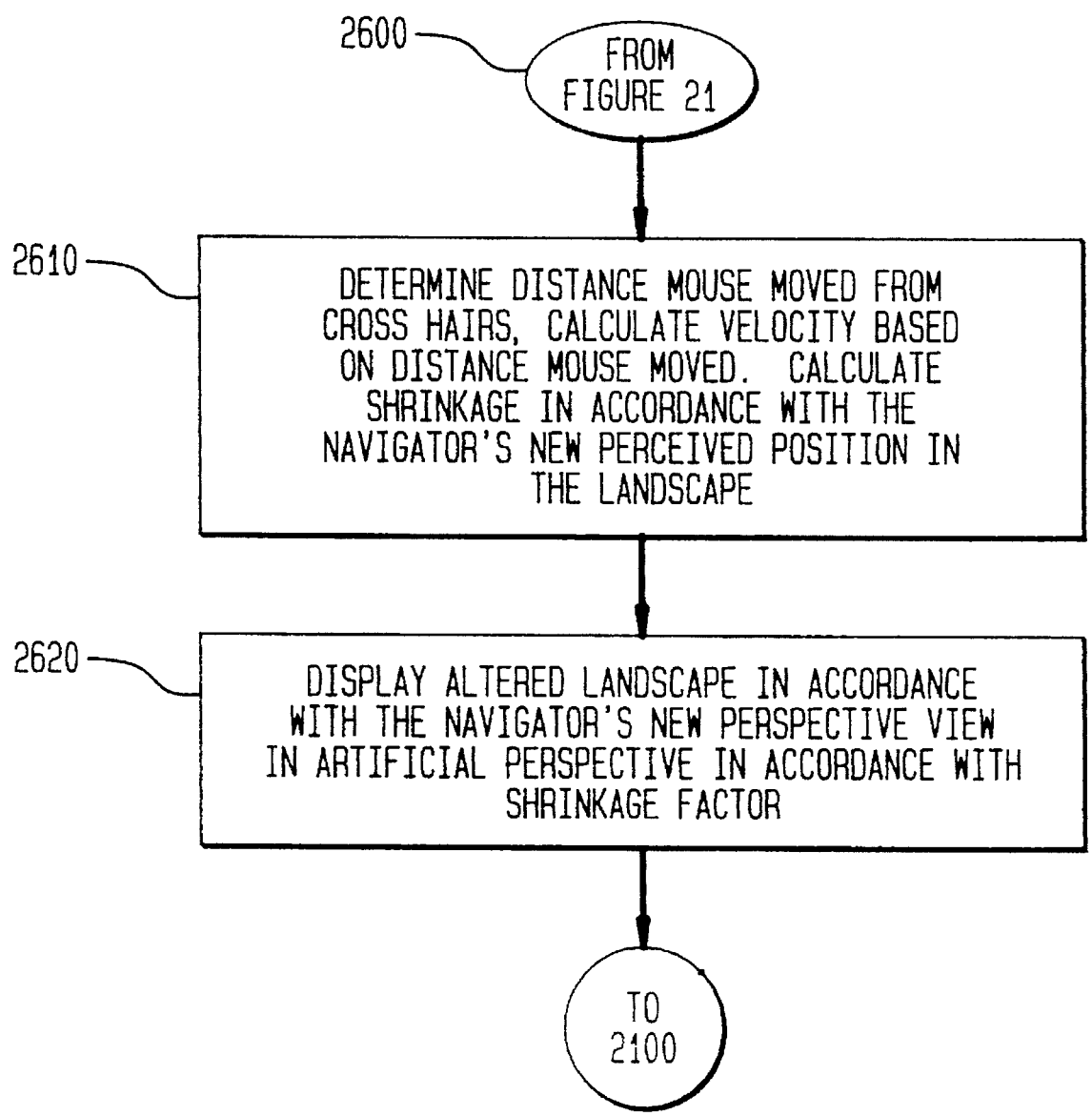
Figure 27:
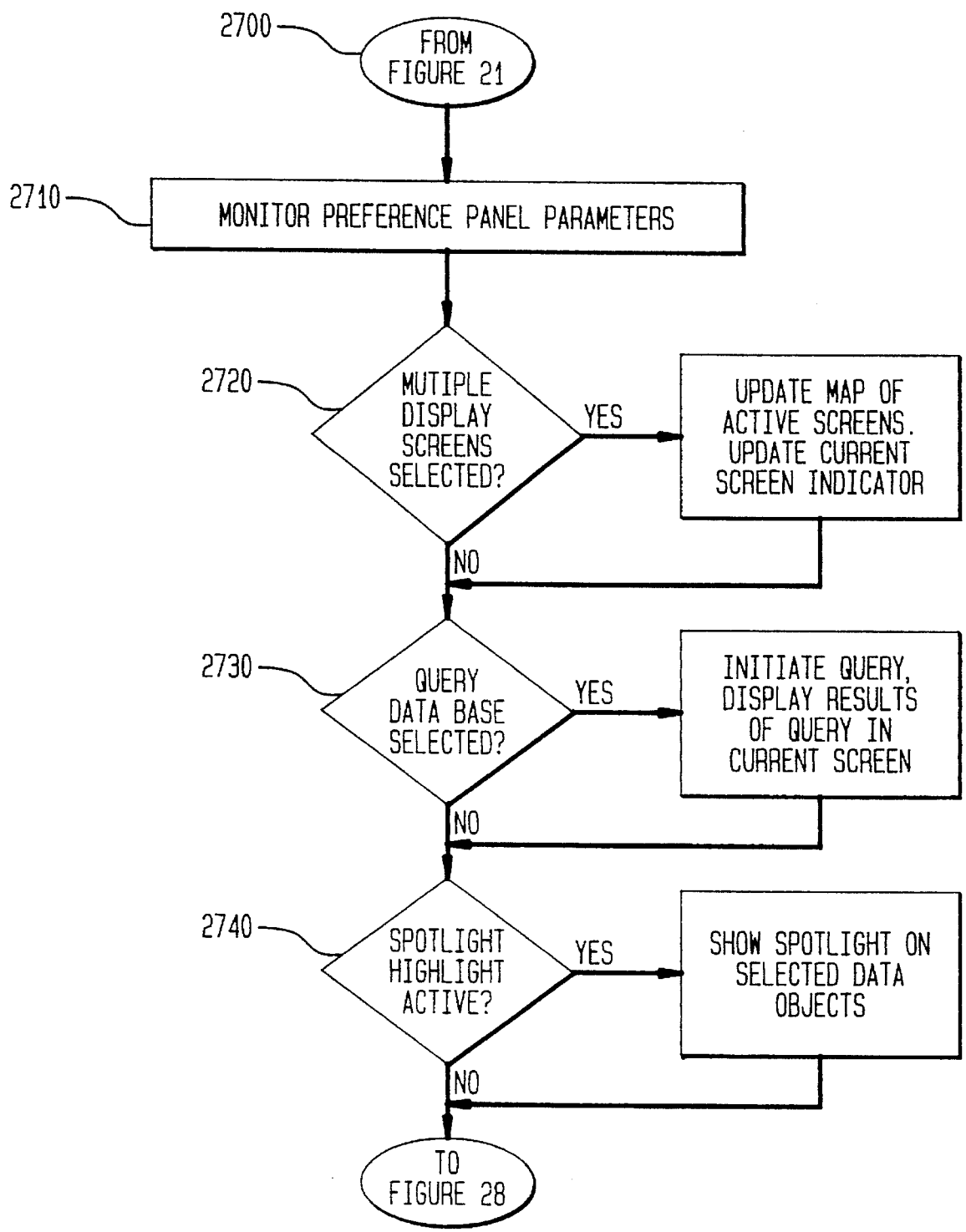
Figure 28:
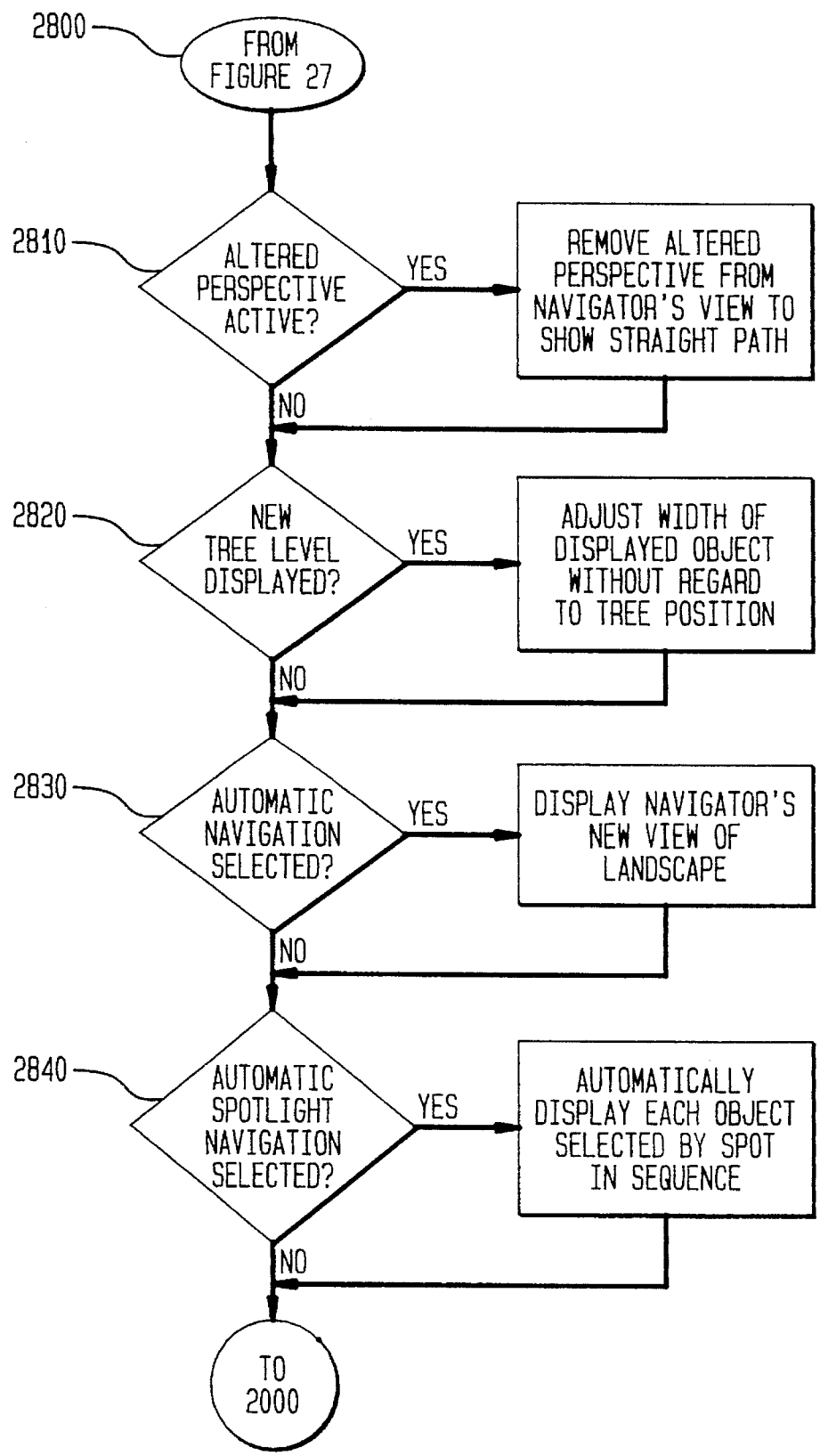

Turning now to FIG. 18, in block 1810 the present invention displays a cursor in a two-dimensional overview of the display space; enables a user to manipulate the position of the cursor within the overview; and manipulates a view of the three-dimensional space in accordance with the position of the cursor within the overview. In block 1830 the present invention stores the present state of display space, navigator view, and object locations.

Functional Descriptions: an example of Preferred Procedures

The following is a high level psuedocode description of the procedures existing in a preferred embodiment of the present invention.

Startup Procedure
load the data base and the user preferences
call the layout algorithm
restore the observer's positions in each screen
call the display algorithm for each screen
go to loop procedure
Exit Procedure
save the observer's positions in each screen
save the user preferences
exit
Loop Procedure
if mouse moves over object
    highlight object
    display minimal information about object
if select (click on) object
    brighten colors of object
    display more information about object
    call zoom procedure on object
if select object in overview
    display same information as select object
    brighten colors of object
    if in warp mode switch instantly to object and call
        display
    procedure after switch otherwise call zoom procedure
        on object
if select position (not over object) in overview
    call zoom procedure to selected position
if select hyperlink in warp mode
    switch instantly to cell represented by hyperlink, while
        remaining in warp mode
    call display procedure
if activate (double click) object
    if object is cell
        enter warp mode for object
    otherwise active object
        (e.g. open file, display full data, etc.)
if navigation (middle mouse) selected
    display cross hair
    call navigation procedure
if navigation ended
    remove cross hair
if mark generated
    save position and currently selected object with user
        specified name
if mark selected reselect object saved in mark
call zoom procedure to position saved in mark
if data changed
   cell data changed procedure
if preferences changed
   if preferences affect layout call layout procedure
   if preferences affect display call display procedure
if query made
   determine cells and data blocks that match query
   set spotlight state for each of those cells and blocks
   call display procedure
Layout procedure
call layout procedure for top cell
Layout procedure for cell
recursively call layout procedure on each child cell for each data block in cell
   determine size, color, and position within cell
   call height procedure to determine height of data block
determine size, color, and position of cells based on data blocks and child cells
call height procedure to determine height of cell
determine positions of lines to child cells
shrink all x axis geometry based on the y position of the cell
Display procedure
if in warp mode, go to warp display procedure instead
determine current observer position
apply geometric transformations based on observer's x, y, z, and tilt.
determine x shrinkage factor based on observers y position
apply geometric transformation, expanding in x direction based on shrinkage
render ground and sky
apply display procedure for top level cell
Cell display procedure
run display procedure for each child cell
if line to child cell is not off screen, draw it
if cell is off not visible, return
if cell is far and small (based on preferences) return
draw block representing cell with previously calculated color and geometry, applying lighting procedures for 3D appearance
if cell is far (based on preferences) and has most blocks of same color, draw top of cell in that color
if cell is close (based on preferences) draw icon and/or text for cell
apply data display render procedure for each data block in cell
Data block display procedure
if data block is selected or result of search draw spotlight to it
if data block is very far and small (based on preferences) and majority of the data blocks in cell are the same color, return
if data block is very far (based on preferences) draw colored line of appropriate geometry and return
if data block is far (based on preferences) draw colored plane of appropriate geometry and return
data block in zoomed to draw short block and pole of appropriate color and geometry applying lighting procedures for 3D appearance
otherwise draw block of appropriate color and geometry applying lighting procedures for 3D appearance
if disks in use, draw disk of appropriate height and geometry
if data block is close (based on preferences) draw icons and/or text
Overview display procedure
if overview not displayed, return
for each cell draw rectangle of appropriate position and size
draw lines connecting rectangles
draw X's representing positions of observer in each screen
Warp display procedure
determine observer position within the warp space
apply geometric transformations based on observer's x, y, z, and tilt
render ground and sky
draw cell block in appropriate geometry
apply data block render procedure for each data block in cell
draw hyperlink connections for child, parent, and sibling cells
Height procedure
break objects up into pools
   cells and data blocks are in separate pools
   in a cumulating layout (e.g. sales data base) each level of cells is a separate pool
   in non cumulating layout (e.g. file system) all levels are in the same pool
   find largest object in each pool
   set height of the object to predetermined height (based on user preferences)
   set other objects in pool proportional to that height based on their size (if user preference is for exaggerated mode height is proportional to square root of size)
determine distance mouse moved from cross hairs in x and y distance
multiply distances by mouse speed factor (based on preferences)
divide x distance by shrinkage factor based on current observer y position
update observer position by new x and y
call display procedure
update user's position in overview
Zoom procedure
determine number of steps in zoom based on zoom speed (based on preferences), distance to target, and processor's speed in updating display
determine x, y, and z distance from target
divide x distance by shrinkage factor based on current observer y position
for each step,
   calculate a new y and z based on the distance and number of steps remaining
   calculate the shrinkage factor at that new y
   determine a new x position, such that when modified by the newshrinkage factor its distance from the destination has the same ratio with the y distance as the old x had relative to the old y when modified with the old shrinkage factor
   update the observer's position with the new x, y, and z and call the display procedure if any user actions discontinue zoom and process user action recalculate number of steps based on the time to redraw the most recent scene update observer's position in overview Data change and update procedure save observer's position in each screen relative to the current selection in that screen call layout procedure (in alternate embodiment just re-layout the data that has changed)

restore observer's position in each screen relative to the current selection in that screen call the display algorithm for each screen call the overview display procedure While an example of a preferred embodiment have been shown, the above description is intended to be exemplary of the use of the invention, and is not intended to limit the scope of the claimed invention.

What is claimed is:

1. A method for navigating through data within a display by transforming said data into a three-dimensional information landscape representation of the data, said three-dimensional information landscape comprising objects arranged in a three-dimensional landscape, said objects corresponding to data elements in said data, and said objects having object attributes corresponding to data fields characterizing said data elements, said method for navigating comprising the steps of:

(a) defining said data elements and said data fields characterizing said data elements;

(b) defining said object attributes characterizing said objects in said three-dimensional landscape;

(c) creating said three-dimensional information landscape representation of said data by transforming data elements of said data into corresponding objects arranged in said three-dimensional landscape, wherein said transforming of said data elements further includes mapping data fields characterizing said data elements into object attributes characterizing said objects such that said object attributes are indicative of information in said data fields;

(d) displaying said three-dimensional information landscape representation of said data to extend from a foreground at or near said display to a horizon located beyond the display relative to the viewpoint of a user including:

displaying said objects in a hierarchy of levels, each level containing objects having a common data field associated with said respective level during said mapping, accumulating data information at each level of the hierarchy so that at least one of said object attributes of said objects in each level represents a sum of data information in corresponding objects in lower levels in the hierarchy, and normalizing sizes of said objects displayed at each level of the hierarchy independent of the size of objects at other levels in the hierarchy; and (e) navigating through said three-dimensional information landscape representation of said data.

2. The method of claim 1 further comprising the step of:

displaying a plurality of objects corresponding to said data elements having a first common data field as a plurality of columns, each column having a height representative of the value of the first common data field for the respective data element, wherein a variation in the height of the columns represents a variation in the values of said first common data field amongst the data elements.

3. The method of claim 2 further comprising the steps of:

(a) displaying a disk on at least one of said columns, said disk having an axis coincident with a longitudinal axis of a column; and (b) adjusting a height of the disk with respect to a height of the column to indicate a comparison between the values of data fields for a particular data element corresponding to said column and disk.

4. The method of claim 2 further comprising the steps of:

(a) displaying said three-dimensional landscape as a plane, said plane representing a threshold value for said first common data field represented by the height of said columns; and b) displaying a column to extend underneath the plane when the column height represents a value below the threshold value represented by the plane.

5. The method of claim 2 further comprising the steps of:

(a) displaying a pedestal upon a plane within the three-dimensional landscape;

(b) selectively displaying said columns having a second common data field upon the pedestal; and (c) altering a color of the pedestal to represent a sum of the values of either said first common data field, said second common data field, or another common data field of the columns displayed upon the pedestal.

6. The method of claim 2 further comprising the steps of:

(a) displaying a pedestal upon a plane within the three-dimensional landscape;

(b) selectively displaying said columns having a second common data field upon the pedestal; and (c) altering a size of the pedestal to represent a sum of the values of either said first common data field, said second common data field, or another common data field of the columns displayed upon the pedestal.

7. The method of claim 1 further comprising the steps of:

(a) displaying a plurality of said objects as columns in said three-dimensional landscape; and (b) reducing the width of a column when the column or a cell block containing the column is selected during zooming.

8. The method of claim 1 further comprising the steps of:

(a) displaying data elements in said data as a plurality of blocks in the three-dimensional landscape; and (b) displaying data fields characterizing said data elements as icons on said blocks.

9. The method of claim 1 wherein said object attributes include textual, executable, and audible attributes.

10. The method of claim 1 further comprising the step of:

enabling a user to select data corresponding to a data element represented by an object displayed in said three-dimensional landscape after navigating to said object.

11. The method of claim 1 further comprising the step of:

altering the display of said three-dimensional information landscape representation of data during said navigating step (e) so that objects along a field of view of the user move from the horizon toward the foreground, and wherein objects and their object attributes are displayed at a greater resolution when said objects appear in said foreground than when said objects appear at or near said horizon.

12. The method of claim 1 further comprising the step of:

altering a displayed object shape so that the displayed object appears as a three-dimensional object in said three-dimensional landscape when a navigator is close to the displayed object and changes into a two-dimensional object as the navigator moves a predetermined distance along said three-dimensional landscape away from the displayed object.

13. The method of claim 1 further comprising the step of:

displaying three-dimensional objects of similar height as two-dimensional objects on the three-dimensional information landscape as a navigator moves a predetermined distance along said three-dimensional information landscape away from the objects.

14. The method of claim 1 further comprising the step of:

removing an object from the three-dimensional information landscape as the navigator moves a predetermined distance along said three-dimensional information landscape away from the displayed object.

15. The method of claim 1 further comprising the step of displaying a parameter selection panel, wherein said defining step (a) comprises entering parameter selections defining said data elements and said data fields characterizing said data elements and said defining step (b) comprises entering parameter selections defining said object attributes characterizing said objects.

16. The method of claim 1 wherein said navigating step (e) includes the steps of:

displaying a cursor at a position in a two-dimensional overview;

changing the position of the cursor within the overview; and altering the displayed view of said three-dimensional information landscape in accordance with the changing position of the cursor within the overview to navigate through said three-dimensional information landscape.

17. The method of claim 1 wherein said creating step creates a three-dimensional information landscape representation of data comprising objects laid out on a substantially-planar landscape.

18. The method of claim 1 further comprising the step of displaying hyperlinks for navigating to specific locations on said three-dimensional information landscape representation of data.

19. The method of claim 1 further comprising the steps of:

displaying groups of objects in cell blocks; and displaying connection lines between parent cell blocks and child cell blocks.

20. The method of claim 19 further comprising the step of navigating between parent and child cell blocks by selecting a connection line.

21. The method of claim 1 wherein said data comprises sales data or file directories.

22. A method of displaying data information representative of data to a navigator on a display comprising the steps of:

displaying a landscape;

displaying data objects arranged within the landscape, said data objects indicating said data information;

changing a display view of said landscape as the navigator browses through said data objects within the landscape; and further comprising the steps of:

displaying said data objects in a hierarchy of levels;

accumulating data information at each level of the hierarchy so that said data objects in each level represents a sum of data information in lower levels in the hierarchy; and normalizing sizes of said data objects displayed at each level of the hierarchy independent of the size of data objects at other levels in the hierarchy.

23. An apparatus for navigating through data within a display by transforming said data into a three-dimensional information landscape representation of the data, said three-dimensional information landscape comprising objects arranged in a three-dimensional landscape, said objects corresponding to data elements in said data, and said objects having object attributes corresponding to data fields characterizing said data elements, said apparatus for navigating comprising:

(a) means for defining said data elements and said data fields characterizing said data elements;

(b) means for defining said object attributes characterizing said objects in said three-dimensional landscape;

(c) means for creating said three-dimensional information landscape representation of said data by transforming data elements of said data into corresponding objects arranged in said three-dimensional landscape, wherein said creating means further includes means for mapping data fields characterizing said data elements into object attributes characterizing said objects such that said object attributes are indicative of information in said data fields;

(d) means for displaying said three-dimensional information landscape representation of said data to extend from a foreground at or near said display to a horizon located beyond the display relative to the viewpoint of a user, wherein said displaying means further includes:

means for displaying said objects in a hierarchy of levels, each level containing objects having a common data field associated with said respective level during said mapping by said mapping means, means for accumulating data information at each level of the hierarchy so that at least one of said object attributes of said objects in each level represents a sum of data information in corresponding objects in lower levels in the hierarchy, and means for normalizing sizes of said objects displayed at each level of the hierarchy independent of the size of objects at other levels in the hierarchy; and (e) means for navigating through said three-dimensional information landscape representation of said data.

24. The apparatus of claim 23 further comprising:

means for displaying a plurality of objects corresponding to said data elements having a first common data field as a plurality of columns, each column having a height representative of the value of the first common data field for the respective data element, wherein a variation in the height of the columns represents a variation in the values of said first common data field amongst the data elements.

25. The apparatus of claim 24 further comprising:

(a) means for displaying a disk on at least one of said columns, said disk having an axis coincident with a longitudinal axis of a column; and (b) means for adjusting a height of the disk with respect to a height of the column to indicate a comparison between the values of data fields for a particular data element corresponding to said column and disk.

26. The apparatus of claim 24 further comprising:

(a) means for displaying said three-dimensional landscape as a plane, said plane representing a threshold value for said first common data field represented by the height of said columns; and (b) means for displaying a column to extend underneath the plane when the column height represents a value below the threshold value represented by the plane.

27. The apparatus of claim 24 further comprising:
(a) means for displaying a pedestal upon a plane within the three-dimensional landscape;
(b) means for selectively displaying said columns having a second common data field upon the pedestal; and
(c) means for altering a color of the pedestal to represent a sum of the values of either said first common data field, said second common data field, or another common data field of the columns displayed upon the pedestal.

28. The apparatus of claim 24 further comprising:
(a) means for displaying a pedestal upon a plane within the three-dimensional landscape;
(b) means for selectively displaying said columns having a second common data field upon the pedestal; and
(c) means for altering a size of the pedestal to represent a sum of the values of either said first common data field, said second common data field, or another common data field of the columns displayed upon the pedestal.

29. The apparatus of claim 23 further comprising:
(a) means for displaying a plurality of said objects as columns in said three-dimensional landscape; and
(b) means for reducing the width of a column when the column or a cell block containing the column is selected during zooming.

30. The apparatus of claim 23 further comprising:
(a) means for displaying data elements in said data as a plurality of blocks in the three-dimensional landscape; and
(b) means for displaying data fields characterizing said data elements as icons on said blocks.

31. The apparatus of claim 23 wherein said object attributes include textual, executable, and audible attributes.

32. The apparatus of claim 23 further comprising:
means for enabling a user to select data corresponding to a data element represented by an object displayed in said three-dimensional landscape after navigating to said object.

33. The apparatus of claim 23 wherein said navigation means further includes:
means for altering the display of said three-dimensional information landscape representation of data so that objects along a field of view of the user move from the horizon toward the foreground, and wherein objects and their object attributes are displayed at a greater resolution when said objects appear in said foreground than when said objects appear at or near said horizon.

34. The apparatus of claim 23 wherein said navigation means further includes:
means for altering a displayed object shape so that the displayed object appears as a three-dimensional object in said three-dimensional landscape when a navigator is close to the displayed object and changes into a two-dimensional object as the navigator moves a predetermined distance along said three-dimensional landscape away from the displayed object.

35. The apparatus of claim 23 wherein said navigation means further includes:
means for displaying three-dimensional objects of similar height as two-dimensional objects on the three-dimensional information landscape as a navigator moves a predetermined distance along said three-dimensional information landscape away from the objects.

36. The apparatus of claim 23 wherein said navigation means further includes:
means for removing an object from the three-dimensional information landscape as the navigator moves a predetermined distance along said three-dimensional information landscape away from the displayed object.

37. The apparatus of claim 23 wherein said (a) means for defining said data elements and said data fields characterizing said data elements and said (b) means for defining said object attributes characterizing said objects comprise a parameter selection display panel.

38. The apparatus of claim 23 wherein said (e) navigating means includes:
means for displaying a cursor at a position in a two-dimensional overview;
means for changing the position of the cursor within the overview; and
means for altering the displayed view of said three-dimensional information landscape in accordance with the changing position of the cursor within the overview to navigate through said three-dimensional information landscape.

39. The apparatus of claim 23 wherein said creating means creates a three-dimensional information landscape representation of data comprising objects laid out on a substantially-planar landscape.

40. The apparatus of claim 23 further comprising means for displaying hyperlinks for navigating to specific locations on said three-dimensional information landscape representation of data.

41. The apparatus of claim 23 further comprising:
means for displaying groups of objects in cell blocks; and
means for displaying connection lines between parent cell blocks and child cell blocks.

42. The apparatus of claim 41, further comprising means for navigating between parent and child cell blocks by selecting a connection line.

43. The apparatus of claim 23, wherein said data comprises sales data or file directories.

44. A display apparatus for displaying data information representative of data to a navigator comprising:
means for displaying a landscape;
means for displaying data objects arranged within said landscape, said data objects indicating said data information;
means for changing a display view of said landscape as the navigator browses through said data objects within the landscape; and
further comprising:
means for displaying said data objects in a hierarchy of levels;
means for accumulating data information at each level of the hierarchy so that said data objects in each level represents a sum of data information in lower levels in the hierarchy; and
means for normalizing sizes of said data objects displayed at each level of the hierarchy independent of the size of data objects at other levels in the hierarchy.

45. A computer-implemented method for navigating through data by transforming said data into a three-dimensional information landscape representation of the data comprising the steps of:

mapping data fields characterizing data elements in said data into object attributes characterizing objects arranged in a three-dimensional information landscape to create said three-dimensional information landscape representation of said data;

displaying said three-dimensional information landscape representation of said data including:

displaying said objects in a hierarchy of levels, each level containing objects having a common data field associated with said respective level during said mapping, accumulating data information at each level of the hierarchy so that at least one of said object attributes of said objects in each level represents a sum of data information in corresponding objects in lower levels in the hierarchy, and normalizing sizes of said objects at each level of the hierarchy independent of the size of objects at other levels in the hierarchy; and navigating through said three-dimensional information landscape representation of said data displayed in said displaying step.

46. A computer system for navigating through data by transforming said data into a three-dimensional information landscape representation of the data comprising:

means for mapping data fields characterizing data elements in said data into object attributes characterizing objects arranged in a three-dimensional information landscape to create said three-dimensional information landscape representation of said data;

means for displaying said three-dimensional information landscape representation of said data, wherein, said displaying means further includes:

means for displaying said objects in a hierarchy of levels, each level containing objects having a common data field associated with said respective level during said mapping, means for accumulating data information at each level of the hierarchy so that at least one of said object attributes of said objects in each level represents a sum of data information in corresponding objects in lower levels in the hierarchy, and means for normalizing sizes of said objects at each level of the hierarchy independent of the size of objects at other levels in the hierarchy; and means for navigating through said three-dimensional information landscape representation of said data.

47. A method for navigating through data within a display by transforming said data into a three-dimensional information landscape representation of the data, said three-dimensional information landscape comprising objects arranged in a three-dimensional landscape, said objects corresponding to data elements in said data, and said objects having object attributes corresponding to data fields characterizing said data elements, said method for navigating comprising the steps of:

defining said data elements and said data fields characterizing said data elements;

defining said object attributes characterizing said objects in said three-dimensional landscape;

creating said three-dimensional information landscape representation of said data by transforming data elements of said data into corresponding objects arranged in said three-dimensional landscape, wherein said transforming of said data elements further includes mapping data fields characterizing said data elements into object attributes characterizing said objects such that said object attributes are indicative of information in said data fields;

displaying said three-dimensional information landscape representation of said data to extend from a foreground at or near said display to a horizon located beyond the display relative to the viewpoint of a user, including displaying a plurality of said objects as columns in said three-dimensional landscape and reducing the width of a column when the column or a cell block containing the column is selected during zooming; and navigating through said three-dimensional information landscape representation of said data.

48. An apparatus for navigating through data within a display by transforming said data into a three-dimensional information landscape representation of the data, said three-dimensional information landscape comprising objects arranged in a three-dimensional landscape, said objects corresponding to data elements in said data, and said objects having object attributes corresponding to data fields characterizing said data elements, said apparatus for navigating comprising:

means for defining said data elements and said data fields characterizing said data elements;

means for defining said object attributes characterizing said objects in said three-dimensional landscape;

means for creating said three-dimensional information landscape representation of said data by transforming data elements of said data into corresponding objects arranged in said three-dimensional landscape, wherein said creating means further includes means for mapping data fields characterizing said data elements into object attributes characterizing said objects such that said object attributes are indicative of information in said data fields;

means for displaying said three-dimensional information landscape representation of said data to extend from a foreground at or near said display to a horizon located beyond the display relative to the viewpoint of a user, including displaying a plurality of said objects as columns in said three-dimensional landscape and reducing the width of a column when the column or a cell block containing the column is selected during zooming; and means for navigating through said three-dimensional information landscape representation of said data.

* * * * *